(12) United States Patent
Tsai

(10) Patent No.: US 8,094,231 B2
(45) Date of Patent: Jan. 10, 2012

(54) PHOTOGRAPHING OPTICAL LENS ASSEMBLY

(75) Inventor: Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 113 days.

(21) Appl. No.: 12/775,965

(22) Filed: May 7, 2010

(65) Prior Publication Data

US 2011/0096221 A1 Apr. 28, 2011

(30) Foreign Application Priority Data

Oct. 28, 2009 (TW) ................................ 98136452 A

(51) Int. Cl.
*H04N 5/225* (2006.01)
*H04N 5/228* (2006.01)

(52) U.S. Cl. ................... 348/335; 348/208.11; 348/340; 359/717

(58) Field of Classification Search ............ 348/208.11, 348/240.1, 240.3, 259, 333.08, 335, 340
See application file for complete search history.

(56) References Cited

U.S. PATENT DOCUMENTS

| | | | | |
|---|---|---|---|---|
| 6,970,306 B2 * | 11/2005 | Matsuo | | 359/716 |
| 6,977,779 B2 * | 12/2005 | Shinohara | | 359/716 |
| 7,130,133 B2 * | 10/2006 | Sun | | 359/716 |
| 7,436,603 B2 | 10/2008 | Huang et al. | | |
| 7,821,724 B2 * | 10/2010 | Tang et al. | | 359/717 |
| 2010/0321798 A1 * | 12/2010 | Chen et al. | | 359/738 |

* cited by examiner

*Primary Examiner* — Hung Lam
(74) *Attorney, Agent, or Firm* — Morris Manning & Martin LLP; Tim Tingkang Xia, Esq.

(57) ABSTRACT

This invention provides a photographing optical lens assembly comprising, in order from an object side to an image side: a first lens element with positive refractive power having a convex object-side surface and a convex image-side surface; a second lens element with positive refractive power having a concave object-side surface and a convex image-side surface, both of the two surfaces being aspheric; a third lens element with negative refractive power having a concave image-side surface on which at least one inflection point is formed, both of the two surfaces being aspheric; and a stop disposed between an imaged object and the second lens element; wherein there are only three lens elements with refractive power. Such an arrangement of optical elements can effectively reduce the size of the lens assembly, mitigate the sensitivity of the optical system and enable the lens assembly to obtain a higher resolution.

25 Claims, 25 Drawing Sheets

| TABLE 1 | | | | | | | |
|---|---|---|---|---|---|---|---|
| (Embodiment 1) | | | | | | | |
| f = 2.51 mm, Fno = 2.84, HFOV = 30.0 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.039 | | | | |
| 2 | Lens 1 | 1.68759 (ASP) | 0.448 | Plastic | 1.544 | 55.9 | 2.46 |
| 3 | | -5.88240 (ASP) | 0.629 | | | | |
| 4 | Lens 2 | -0.67509 (ASP) | 0.375 | Plastic | 1.544 | 55.9 | 2.84 |
| 5 | | -0.56159 (ASP) | 0.050 | | | | |
| 6 | Lens 3 | 2.58142 (ASP) | 0.430 | Plastic | 1.544 | 55.9 | -2.85 |
| 7 | | 0.91184 (ASP) | 0.300 | | | | |
| 8 | IR-Filter | Plano | 0.300 | Glass | 1.517 | 64.2 | - |
| 9 | | Plano | 0.200 | | | | |
| 10 | Cover-glass | Plano | 0.450 | Glass | 1.517 | 64.2 | - |
| 11 | | Plano | 0.171 | | | | |
| 12 | Image | Plano | | | | | |

Fig.7

| TABLE 2 | | | |
|---|---|---|---|
| Aspheric Coefficients | | | |
| Surface # | 2 | 3 | 4 |
| k = | -2.44634E+00 | -1.00000E+00 | -4.80957E-01 |
| A4 = | -5.25008E-02 | -1.89584E-01 | 8.28285E-02 |
| A6 = | -3.14575E-01 | -3.32579E-01 | 9.88682E-01 |
| A8 = | 8.10708E-01 | 5.78378E-01 | 2.70930E+00 |
| A10= | -3.20165E+00 | -1.45996E+00 | -3.91226E+00 |
| Surface # | 5 | 6 | 7 |
| k = | -2.78958E+00 | -1.77215E+01 | -9.24347E+00 |
| A4 = | -7.00427E-01 | -3.75363E-01 | -3.14863E-01 |
| A6 = | 1.11676E+00 | 4.17439E-01 | 2.76103E-01 |
| A8 = | 1.44575E+00 | -3.01811E-01 | -2.27130E-01 |
| A10= | -1.40101E+00 | -4.35149E-02 | 9.64520E-02 |
| A12= | | 1.20730E-01 | -1.84219E-02 |

Fig.8

| TABLE 3 | | | | | | |
|---|---|---|---|---|---|---|
| (Embodiment 2) | | | | | | |
| f = 4.64 mm, Fno = 2.73, HFOV = 30.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.122 | | | | |
| 2 | Lens 1 | 2.26021 (ASP) | 0.770 | Plastic | 1.544 | 55.9 | 3.42 |
| 3 | | -9.21970 (ASP) | 0.717 | | | | |
| 4 | Lens 2 | -0.99298 (ASP) | 0.517 | Plastic | 1.583 | 30.2 | 31.43 |
| 5 | | -1.12266 (ASP) | 1.126 | | | | |
| 6 | Lens 3 | -17.61800 (ASP) | 0.670 | Plastic | 1.632 | 23.4 | -6.73 |
| 7 | | 5.69400 (ASP) | 0.700 | | | | |
| 8 | IR-Filter | Plano | 0.300 | Glass | 1.517 | 64.2 | - |
| 9 | | Plano | 0.501 | | | | |
| 10 | Image | Plano | | | | | |

Fig.9

| TABLE 4 | | | |
|---|---|---|---|
| Aspheric Coefficients | | | |
| Surface # | 2 | 3 | 4 |
| k = | -4.23081E+00 | -1.00000E+00 | -8.90342E-01 |
| A4 = | 1.13683E-02 | -7.49191E-02 | -1.92644E-02 |
| A6 = | -1.34388E-02 | -5.11049E-02 | 1.61233E-01 |
| A8 = | -4.92100E-02 | 8.68220E-02 | 1.70913E-01 |
| A10 = | -1.84676E-03 | -1.52519E-01 | -1.95075E-01 |
| A12 = | 7.27668E-02 | 1.42676E-01 | -7.51484E-03 |
| A14= | -6.50078E-02 | -5.71681E-02 | 3.79234E-02 |
| Surface # | 5 | 6 | 7 |
| k = | -7.65382E-01 | -2.98208E+02 | -3.37374E+01 |
| A4 = | 8.32350E-02 | -2.58228E-02 | -3.73916E-02 |
| A6 = | 2.12739E-02 | 1.32599E-02 | 1.35604E-02 |
| A8 = | 1.44408E-01 | -5.06864E-03 | -3.86224E-03 |
| A10= | -5.13585E-02 | 5.92747E-04 | 4.76653E-04 |
| A12= | -2.60599E-02 | 5.43627E-05 | -1.55190E-05 |
| A14= | 1.18323E-02 | -1.45754E-05 | -1.57778E-06 |

Fig.10

| TABLE 5 | | | | | | |
|---|---|---|---|---|---|---|
| (Embodiment 3) | | | | | | |
| f = 4.17 mm, Fno = 2.85, HFOV = 33.5 deg. | | | | | | |
| Surface # | | Curvature Radius | Thickness | Material | Index | Abbe # | Focal length |
| 0 | Object | Plano | Infinity | | | | |
| 1 | Lens 1 | 3.88510 (ASP) | 0.597 | Plastic | 1.544 | 55.9 | 5.68 |
| 2 | | -14.28570 (ASP) | 0.381 | | | | |
| 3 | Ape. Stop | Plano | 1.465 | | | | |
| 4 | Lens 2 | -1.59255 (ASP) | 0.745 | Plastic | 1.544 | 55.9 | 3.72 |
| 5 | | -1.03871 (ASP) | 0.050 | | | | |
| 6 | Lens 3 | 2.78937 (ASP) | 0.861 | Plastic | 1.544 | 55.9 | -4.60 |
| 7 | | 1.17545 (ASP) | 1.000 | | | | |
| 8 | IR-Filter | Plano | 0.300 | Glass | 1.517 | 64.2 | - |
| 9 | | Plano | 0.410 | | | | |
| 10 | Image | Plano | | | | | |

Fig.11

| TABLE 6 | | | |
|---|---|---|---|
| Aspheric Coefficients | | | |
| Surface # | 1 | 2 | 4 |
| k = | -2.84967E+00 | -1.00000E+00 | -1.06297E+00 |
| A4 = | -1.26664E-02 | -1.78047E-02 | 1.33217E-02 |
| A6 = | -3.80321E-03 | -5.13862E-03 | -1.56521E-01 |
| A8 = | -1.90341E-03 | -3.84910E-04 | 1.45358E-01 |
| A10 = | -7.40317E-04 | -2.28385E-04 | -3.78820E-02 |
| A12 = | | -1.11743E-03 | 1.96954E-03 |
| A14 = | | 6.25088E-04 | 6.86035E-03 |
| A16= | | | -3.74579E-03 |
| Surface # | 5 | 6 | 7 |
| k = | -1.09436E+00 | -1.08664E+01 | -5.46081E+00 |
| A4 = | 3.46925E-02 | -4.94222E-02 | -2.90719E-02 |
| A6 = | -5.64032E-02 | 2.19187E-02 | 4.37285E-03 |
| A8 = | 1.02640E-02 | -4.16031E-03 | -1.77470E-04 |
| A10= | 9.38976E-03 | 3.06576E-04 | -2.26169E-05 |
| A12= | 8.78875E-05 | 1.06424E-06 | -3.33389E-06 |
| A14= | 8.77169E-04 | 2.44504E-08 | 8.88505E-07 |
| A16= | -6.29366E-04 | -1.35361E-07 | -5.13863E-08 |

Fig.12

| TABLE 7 | | | | | | |
|---|---|---|---|---|---|---|
| (Embodiment 4) | | | | | | |
| f = 4.13 mm, Fno = 2.85, HFOV = 33.4 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.031 | | | | |
| 2 | Lens 1 | 1.88215 (ASP) | 0.647 | Plastic | 1.530 | 55.8 | 3.30 |
| 3 | | -21.36750 (ASP) | 0.484 | | | | |
| 4 | Lens 2 | -0.83504 (ASP) | 0.440 | Plastic | 1.544 | 55.9 | 59.60 |
| 5 | | -0.96524 (ASP) | 0.845 | | | | |
| 6 | Lens 3 | 6.48170 (ASP) | 0.484 | Plastic | 1.544 | 55.9 | -16.49 |
| 7 | | 3.66410 (ASP) | 1.000 | | | | |
| 8 | IR-Filter | Plano | 0.300 | Glass | 1.517 | 64.2 | - |
| 9 | | Plano | 0.730 | | | | |
| 10 | Image | Plano | | | | | |

Fig.13

| TABLE 8 | | | |
|---|---|---|---|
| Aspheric Coefficients | | | |
| Surface # | 2 | 3 | 4 |
| k = | -3.52333E+00 | -1.00000E+00 | -1.22376E+00 |
| A4 = | 3.20455E-02 | -4.31194E-02 | 4.36921E-02 |
| A6 = | 5.91124E-02 | -1.16322E-01 | 2.11210E-01 |
| A8 = | -1.44845E-01 | 2.59570E-01 | 2.37511E-01 |
| A10 = | -3.57990E-03 | -2.63601E-01 | -2.66921E-01 |
| A12 = | 1.77155E-01 | 2.64040E-01 | -2.73505E-02 |
| A14= | -7.38028E-02 | -1.06673E-01 | 6.16407E-02 |
| Surface # | 5 | 6 | 7 |
| k = | -1.25625E+00 | 7.29313E+00 | -1.41334E+00 |
| A4 = | 1.16880E-01 | 5.29177E-03 | -3.79742E-02 |
| A6 = | 7.10964E-02 | -2.86531E-02 | 2.68672E-04 |
| A8 = | 1.21363E-01 | -2.11362E-04 | -4.83551E-03 |
| A10= | -3.60684E-02 | 1.57571E-03 | 1.23755E-03 |
| A12= | -2.00188E-02 | -4.13279E-04 | -1.05220E-06 |
| A14= | -4.89753E-03 | -5.09035E-05 | -4.19542E-05 |

Fig.14

| TABLE 9 | | | | | | |
|---|---|---|---|---|---|---|
| (Embodiment 5) | | | | | | |
| f = 4.16 mm, Fno = 2.85, HFOV = 33.3 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.073 | | | | |
| 2 | Lens 1 | 2.49273 (ASP) | 0.518 | Plastic | 1.544 | 55.9 | 3.89 |
| 3 | | -13.08900 (ASP) | 1.035 | | | | |
| 4 | Lens 2 | -0.97862 (ASP) | 0.495 | Plastic | 1.530 | 55.8 | 9.14 |
| 5 | | -0.95678 (ASP) | 0.200 | | | | |
| 6 | Lens 3 | 2.58840 (ASP) | 0.653 | Plastic | 1.514 | 56.8 | -7.60 |
| 7 | | 1.42332 (ASP) | 1.000 | | | | |
| 8 | IR-Filter | Plano | 0.300 | Glass | 1.517 | 64.2 | - |
| 9 | | Plano | 0.732 | | | | |
| 10 | Image | Plano | | | | | |

Fig.15

| TABLE 10 | | | |
|---|---|---|---|
| Aspheric Coefficients | | | |
| Surface # | 2 | 3 | 4 |
| k    = | -7.06854E+00 | -1.00000E+00 | -1.27905E+00 |
| A4 = | -2.06036E-03 | -5.96521E-02 | 1.85981E-02 |
| A6 = | 3.48763E-04 | -5.89815E-02 | 9.01502E-02 |
| A8 = | -5.13534E-02 | 5.43710E-02 | 2.17181E-01 |
| A10 = | -1.14156E-01 | -1.61462E-01 | -2.20976E-01 |
| A12 = | 1.34328E-01 | 2.14103E-01 | -1.75709E-02 |
| A14= | -7.45774E-02 | -1.57399E-01 | 4.45359E-02 |
| Surface # | 5 | 6 | 7 |
| k    = | -7.60594E-01 | -3.79387E+01 | -9.88796E+00 |
| A4 = | 8.01548E-02 | -5.32908E-02 | -6.96273E-02 |
| A6 = | 9.73883E-02 | 1.40829E-02 | 1.83773E-02 |
| A8 = | 1.04588E-01 | -2.78018E-03 | -4.50286E-03 |
| A10= | -5.81061E-02 | 3.50595E-04 | 5.02703E-04 |
| A12= | -1.33001E-02 | -9.77330E-05 | -1.18294E-05 |
| A14= | 7.48031E-03 | 2.48519E-05 | -5.12267E-06 |

Fig.16

| TABLE 11 | | | | | | | |
|---|---|---|---|---|---|---|---|
| (Embodiment 6) | | | | | | | |
| f = 5.22 mm, Fno = 2.90, HFOV = 32.2 deg. | | | | | | | |
| Surface # | | Curvature Radius | Thickness | Material | Index | Abbe # | Focal length |
| 0 | Object | Plano | Infinity | | | | |
| 1 | Lens 1 | 2.02524 (ASP) | 1.200 | Plastic | 1.514 | 56.8 | 3.59 |
| 2 | | -16.66670 (ASP) | 0.096 | | | | |
| 3 | Ape. Stop | Plano | 0.677 | | | | |
| 4 | Lens 2 | -2.10850 (ASP) | 1.200 | Plastic | 1.633 | 23.4 | 3.23 |
| 5 | | -1.26716 (ASP) | 0.229 | | | | |
| 6 | Lens 3 | -2.11633 (ASP) | 1.300 | Plastic | 1.633 | 23.4 | -2.12 |
| 7 | | 4.53300 (ASP) | 0.700 | | | | |
| 8 | IR-Filter | Plano | 0.300 | Glass | 1.517 | 64.2 | - |
| 9 | | Plano | 0.388 | | | | |
| 10 | Image | Plano | | | | | |

Fig.17

| TABLE 12 | | | |
|---|---|---|---|
| Aspheric Coefficients | | | |
| Surface # | 1 | 2 | 4 |
| k = | -1.57804E+01 | -1.00000E+00 | -5.56891E+01 |
| A4 = | 1.96123E-01 | -2.10246E-02 | -6.27127E-01 |
| A6 = | -2.17068E-01 | -3.84608E-02 | 1.71433E+00 |
| A8 = | 1.85561E-01 | 6.03937E-02 | -3.37425E+00 |
| A10 = | -1.06068E-01 | -9.33265E-02 | 3.43267E+00 |
| A12 = | 3.23240E-02 | 8.40227E-02 | -5.24236E-01 |
| A14 = | -4.24165E-03 | -2.92232E-02 | -1.88210E+00 |
| A16= | | | 1.09280E+00 |
| Surface # | 5 | 6 | 7 |
| k = | -3.92572E+00 | 2.97689E-01 | -5.60989E+01 |
| A4 = | -1.12739E-01 | 5.77711E-03 | -3.01868E-02 |
| A6 = | 8.88540E-02 | 2.85738E-02 | 6.15913E-03 |
| A8 = | -2.28824E-02 | -6.74549E-03 | -1.04093E-03 |
| A10= | 7.84013E-03 | 3.27265E-04 | 5.37815E-05 |
| A12= | -2.21717E-03 | 5.96687E-05 | 8.07383E-06 |
| A14= | 1.71563E-04 | 4.14882E-05 | -1.49961E-06 |
| A16= | | | 6.77892E-08 |

Fig.18

| TABLE 13 | | | | | | |
|---|---|---|---|---|---|---|
| | Embodiment 1 | Embodiment 2 | Embodiment 3 | Embodiment 4 | Embodiment 5 | Embodiment 6 |
| f | 2.51 | 4.64 | 4.17 | 4.13 | 4.16 | 5.22 |
| Fno | 2.84 | 2.73 | 2.85 | 2.85 | 2.85 | 2.90 |
| HFOV | 30.0 | 30.5 | 33.5 | 33.4 | 33.3 | 32.2 |
| N1 | 1.544 | 1.544 | 1.544 | 1.530 | 1.544 | 1.514 |
| N2 | 1.544 | 1.583 | 1.544 | 1.544 | 1.530 | 1.633 |
| N3 | 1.544 | 1.632 | 1.544 | 1.544 | 1.514 | 1.633 |
| |V1-V2| | 0.0 | 25.7 | 0.0 | 0.1 | 0.1 | 33.4 |
| |V1-V3| | 0.0 | 32.5 | 0.0 | 0.1 | 0.9 | 33.4 |
| CT1[mm] | 0.448 | 0.770 | 0.597 | 0.647 | 0.518 | 1.200 |
| CT2[mm] | 0.375 | 0.517 | 0.745 | 0.440 | 0.495 | 1.200 |
| R1/f | 0.67 | 0.49 | 0.93 | 0.46 | 0.60 | 0.39 |
| (R1/R2)*10 | -2.87 | -2.45 | -2.72 | -0.88 | -1.90 | -1.22 |
| (R3+R4)/(R3-R4) | 10.90 | -16.31 | 4.75 | -13.83 | 88.62 | 4.01 |
| CT2/f | 0.15 | 0.11 | 0.18 | 0.11 | 0.12 | 0.23 |
| f/f1 | 1.02 | 1.36 | 0.73 | 1.25 | 1.07 | 1.45 |
| f/f2 | 0.88 | 0.15 | 1.12 | 0.07 | 0.46 | 1.62 |
| f2/f3 | -1.00 | -4.67 | -0.81 | -3.61 | -1.20 | -1.52 |
| f/EPD | 2.84 | 2.73 | 2.85 | 2.85 | 2.85 | 2.90 |
| SL/TTL | 0.99 | 0.98 | 0.83 | 0.99 | 0.98 | 0.78 |
| TTL/ImgH | 2.16 | 1.88 | 2.04 | 1.75 | 1.75 | 1.80 |

Fig.19

PHOTOGRAPHING OPTICAL LENS ASSEMBLY

BACKGROUND OF THE INVENTION

1. Field of the Invention

The present invention relates to a photographing optical lens assembly, and more particularly, to a compact photographing optical lens assembly used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and electronic devices have become more compact and powerful, there is an increasing demand for compact imaging lenses featuring better image quality.

A conventional compact imaging lens generally comprises two lens elements so as to reduce the production cost. As the two-element lens has limited capability to correct aberrations, it became insufficient for a high-end photographing module. However, employing excess number of lens elements will make it difficult to reduce the total track length of the lens.

To obtain good image quality and maintain a compact form, a photographing optical lens assembly comprising three lens elements is a feasible solution. The optical lens system for taking image disclosed in U.S. Pat. No. 7,436,603 is of a triplet type comprising, in order from the object side to the image side: a first lens element with positive refractive power; a second lens element with negative refractive power; and a third lens element with positive refractive power. Though such an arrangement facilitates the correction of most of the aberrations caused by the optical system, it requires a longer total track length, and thus the size of the optical lens system for taking image must increase to accommodate the lengthened total track length. Consequently, the optical lens system for taking image is unable to maintain a compact form.

Therefore, a need exists in the art for a photographing optical lens assembly that features better image quality, maintains a moderate total track length and is applicable to compact portable electronic products.

SUMMARY OF THE INVENTION

The present invention provides a photographing optical lens assembly comprising, in order from an object side to an image side: a first lens element with positive refractive power having a convex object-side surface and a convex image-side surface; a second lens element with positive refractive power having a concave object-side surface and a convex image-side surface, the object-side and image-side surfaces thereof being aspheric; a third lens element with negative refractive power having a concave image-side surface on which at least one inflection point is formed, the object-side and image-side surfaces thereof being aspheric; and a stop disposed between an imaged object and the second lens element; wherein there are only three lens elements with refractive power; and wherein the Abbe number of the first lens element is V1, the Abbe number of the second lens element is V2, the Abbe number of the third lens element is V3, the thickness of the first lens element near the optical axis is CT1, the thickness of the second lens element near the optical axis is CT2, the radius of curvature of the object-side surface of the first lens element is R1, the radius of curvature of the image-side surface of the first lens element is R2, and they satisfy the relations: $|V1-V2|<35$, $|V1-V3|<15$, $0.10$ mm$<CT1<1.30$ mm, $0.10$ mm$<CT2<1.00$ mm, $-10.0<(R1/R2)*10<-0.61$.

Such an arrangement of optical elements can effectively reduce the size of the lens assembly, mitigate the sensitivity of the optical system and enable the lens assembly to obtain a higher resolution.

In the present photographing optical lens assembly, the first lens element has positive refractive power so that the total track length of the photographing optical lens assembly can be effectively reduced; the second lens element has positive refractive power which enables redistribution of the refractive power contributed by the first lens element effectively, thereby mitigates the sensitivity of the optical system; the third lens element with negative refractive power and the second lens element with positive refractive power form a telephoto structure, thereby the total track length of the optical system can be effectively reduced to keep the lens assembly compact.

In the present photographing optical lens assembly, the first lens element is a bi-convex lens element with positive refractive power so that the refractive power thereof can be effectively enhanced, thus allowing a shortening of the total track length of the photographing optical lens assembly. The second lens element has a concave object-side surface and a convex image-side surface so that the astigmatism of the optical system can be effectively corrected. The third lens element may be a meniscus lens element having a convex object-side surface and a concave image-side surface, or a bi-concave lens element. When the third lens element is a meniscus lens element, the high order aberrations of the optical system can be corrected favorably. When the third lens element is a bi-concave lens element, the principal point of the optical system can be positioned further away from the image plane, thereby the total track length of the optical system can be favorably reduced to keep the lens assembly compact.

In the present photographing optical lens assembly, the first lens element provides positive refractive power, and the stop is disposed near the object side of the photographing optical lens assembly, thereby the total track length of the photographing optical lens assembly can be effectively reduced. The aforementioned arrangement also enables the exit pupil of the photographing optical lens assembly to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the occurrence of shading. Moreover, the third lens element is provided with at least one inflection point, thereby the angle at which the light is projected onto the sensor from the off-axis field can be effectively reduced to further correct the off-axis aberrations. In addition, for an optical system with a wide field of view, it requires special effort to correct the distortion and chromatic aberration of magnification, and the correction can be made by placing the stop at a location where the refractive power of the optical system is balanced. In other words, when the stop is disposed near the imaged object, the telecentric feature is emphasized and this enables a shorter total track length. When the stop is disposed near the second lens element, the emphasis is on the wide field of view so that the sensitivity of the optical system can be effectively reduced.

The present invention provides another photographing optical lens assembly comprising, in order from the object side to the image side: a first lens element with positive refractive power having a convex object-side surface and a convex image-side surface; a second lens element with positive refractive power having a concave object-side surface and a convex image-side surface, the object-side and image-side surfaces thereof being aspheric; a third lens element with negative refractive power having a concave image-side surface on which at least one inflection point is formed, the object-side and image-side surfaces thereof being aspheric; and a stop disposed between an imaged object and the second lens element; wherein there are only three lens elements with refractive power; and wherein the thickness of the second lens element near the optical axis is CT2, the focal length of the photographing optical lens assembly is f, the radius of curvature of the object-side surface of the first lens element is R1, the radius of curvature of the image-side surface of the first lens element is R2, the Abbe number of the first lens element is V1, the Abbe number of the second lens element is V2, the Abbe number of the third lens element is V3, and they satisfy the relations: $0.05 < CT2/f < 0.19$, $-10.0 < (R1/R2)*10 < -0.61$, $|V1-V2| < 35$, $|V1-V3| < 35, 0.25 < R1/f < 0.63$.

BRIEF DESCRIPTION OF THE DRAWINGS

FIG. 7 is TABLE 1 which lists the optical data of the first embodiment.

FIG. 8 is TABLE 2 which lists the aspheric surface data of the first embodiment.

FIG. 9 is TABLE 3 which lists the optical data of the second embodiment.

FIG. 10 is TABLE 4 which lists the aspheric surface data of the second embodiment.

FIG. 11 is TABLE 5 which lists the optical data of the third embodiment.

FIG. 12 is TABLE 6 which lists the aspheric surface data of the third embodiment.

FIG. 13 is TABLE 7 which lists the optical data of the fourth embodiment.

FIG. 14 is TABLE 8 which lists the aspheric surface data of the fourth embodiment.

FIG. 15 is TABLE 9 which lists the optical data of the fifth embodiment.

FIG. 16 is TABLE 10 which lists the aspheric surface data of the fifth embodiment.

FIG. 17 is TABLE 11 which lists the optical data of the sixth embodiment.

FIG. 18 is TABLE 12 which lists the aspheric surface data of the sixth embodiment.

FIG. 19 is TABLE 13 which lists the data of the respective embodiments resulting from the equations.

DETAILED DESCRIPTION OF THE PREFERRED EMBODIMENTS

Figure 1A:
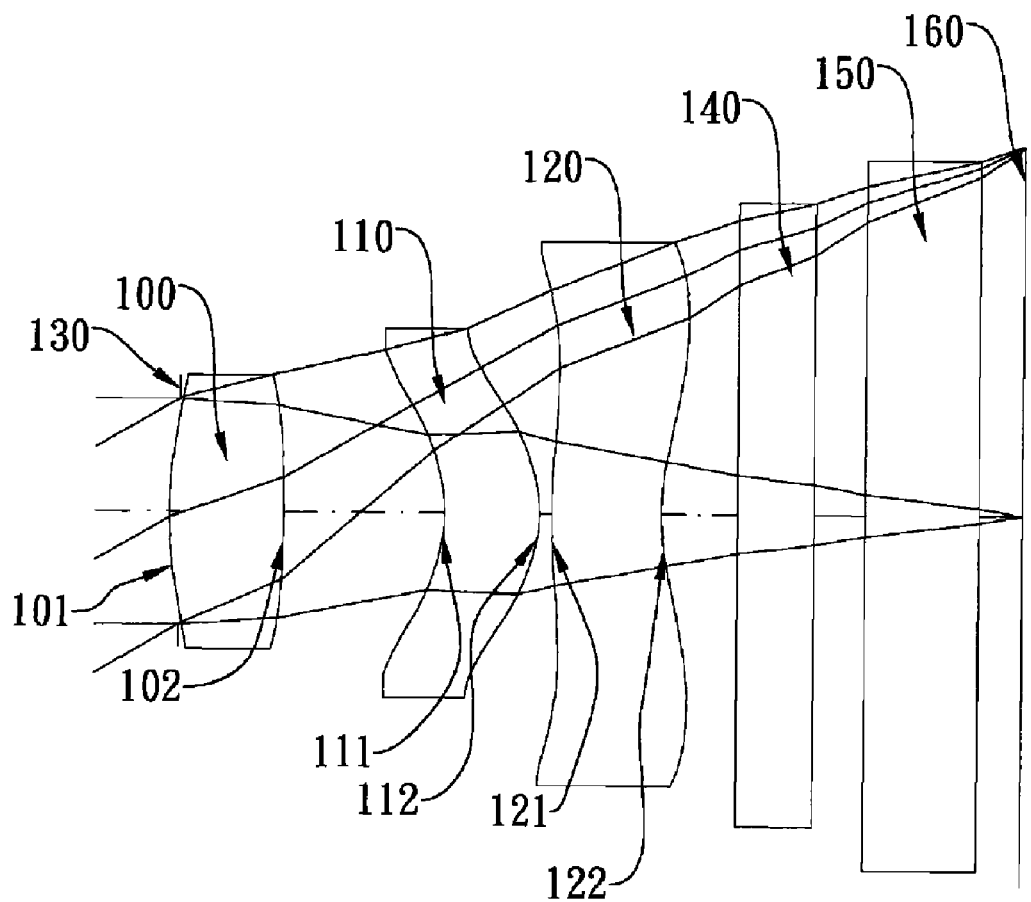
FIG. 1A shows a photographing optical lens assembly in accordance with a first embodiment of the present invention.

The present invention provides a photographing optical lens assembly comprising, in order from an object side to an image side: a first lens element with positive refractive power having a convex object-side surface and a convex image-side surface; a second lens element with positive refractive power having a concave object-side surface and a convex image-side surface, the object-side and image-side surfaces thereof being aspheric; a third lens element with negative refractive power having a concave image-side surface on which at least one inflection point is formed, the object-side and image-side surfaces thereof being aspheric; and a stop disposed between an imaged object and the second lens element; wherein there are only three lens elements with refractive power; and wherein the Abbe number of the first lens element is V1, the Abbe number of the second lens element is V2, the Abbe number of the third lens element is V3, the thickness of the first lens element near the optical axis is CT1, the thickness of the second lens element near the optical axis is CT2, the radius of curvature of the object-side surface of the first lens element is R1, the radius of curvature of the image-side surface of the first lens element is R2, and they satisfy the relations: $|V1-V2| < 35$, $|V1-V3| < 15$, $0.10$ mm $< CT1 < 1.30$ mm, $0.10$ mm $< CT2 < 1.00$ mm, $-10.0 < (R1/R2)*10 < -0.61$.

When the relations of $|V1-V2| < 35$ and $|V1-V3| < 15$ are satisfied, the astigmatism of the photographing optical lens assembly can be corrected favorably to improve the resolution. Preferably, V1 and V2 satisfy the relation: $|V1-V2| < 15$. When the relations of $0.10$ mm $< CT1 < 1.30$ mm and $0.10$ mm $< CT2 < 1.00$ mm are satisfied, the lens elements can be spaced closer together to keep the lens assembly compact, and the moldability and homogeneity of the plastic-injection-molded lenses can be improved. When the relation of $-10.0 < (R1/R2)*10 < -0.61$ is satisfied, the spherical aberration of the optical system can be favorably corrected. Preferably, R1 and R2 satisfy the relation: $-10.0 < (R1/R2)*10 < -2.0$.

In the aforementioned photographing optical lens assembly, it is preferred that at least one of the object-side and image-side surfaces of the first lens element is aspheric. Aspheric surfaces can be easily made into non-spherical profiles, allowing more design parameter freedom which can be used to reduce aberrations and the number of the lens elements, so that the total track length of the optical system can be effectively reduced and the image quality can be improve. Preferably, the third lens element has a convex object-side surface so as to effectively correct the high order aberrations of the optical system.

In the aforementioned photographing optical lens assembly, it is preferred that the second and third lens elements are made of plastic material. Plastic lens elements are not only favorable for the formation of aspheric surfaces but also having lower production costs.

In the aforementioned photographing optical lens assembly, the focal length of the photographing optical lens assembly is f, the focal length of the first lens element is f1, and they preferably satisfy the relation: $1.00<f/f1<2.00$. When the above relation is satisfied, the refractive power of the first lens element is more balanced so that the total track length of the optical system can be effectively controlled, enabling the photographing optical lens assembly to maintain a compact form. The above relation also prevents the high order spherical aberration from becoming too large, so that the image quality of the photographing optical lens assembly can be improved. And it will be more preferable that f and f1 satisfy the relation: $1.20<f/f1<1.70$.

In the aforementioned photographing optical lens assembly, the thickness of the second lens element near the optical axis is CT2, the focal length of the photographing optical lens assembly is f, and they preferably satisfy the relation: $0.05<CT2/f<0.22$. When the above relation is satisfied, the lens elements can be placed closer to each other to keep the lens assembly compact, and the moldability and homogeneity of the plastic-injection-molded lenses can be improved. And preferably CT2 and f satisfy the relation: $0.05<CT2/f<0.19$.

The aforementioned photographing optical lens assembly is provided with a stop and an electronic sensor for image formation of an imaged object. It is preferable that the stop is disposed between the imaged object and the first lens element so that the telecentric feature is emphasized, resulting in a shorter total track length. The spacing near the optical axis between the stop and the electronic sensor is SL, the spacing near the optical axis between the object-side surface of the first lens element and the electronic sensor is TTL (i.e. the total track length of the photographing optical lens assembly), and they preferably satisfy the relation: $0.93<SL/TTL<1.07$. When the above relation is satisfied, the telecentric feature of the photographing optical lens assembly can be secured, thereby effectively reducing the total track length of the optical system.

In the aforementioned photographing optical lens assembly, the radius of curvature of the object-side surface of the first lens element is R1, the focal length of the photographing optical lens assembly is f, and they preferably satisfy the relation: $0.25<R1/f<0.63$. The above relation effectively reduces the total track length of the photographing optical lens assembly and prevents the high order aberrations from becoming too large. And preferably R1 and f satisfy the relation: $0.30<R1/f<0.50$.

In the aforementioned photographing optical lens assembly, the refractive index of the first lens element is N1, the refractive index of the second lens element is N2, the refractive index of the third lens element is N3, and they preferably satisfy the relations: $1.52<N1<1.58$, $1.52<N2<1.58$, $1.52<N3<1.58$. The above relations are favorable for selecting an appropriate optical plastic material for the first, second and third lens elements.

In the aforementioned photographing optical lens assembly, the focal length of the photographing optical lens assembly is f, the focal length of the second lens element is f2, and they preferably satisfy the relation: $0.70<f/f2<2.00$. When the above relation is satisfied, the refractive power contributed by the first lens element can be effectively distributed while the refractive power contributed by the second lens element will not become too large. Accordingly, the sensitivity of the optical system can be favorably reduced and the aberrations can be prevented from becoming too large.

In the aforementioned photographing optical lens assembly, the focal length of the second lens element is f2, the focal length of the third lens element is f3, and they preferably satisfy the relation: $-1.5<f2/f3<-0.5$. When the above relation is satisfied, the telephoto structure formed by the second and third lens elements can be favorably secured, thereby effectively reducing the total track length of the optical system.

In the aforementioned photographing optical lens assembly, the focal length of the photographing optical lens assembly is f, the entrance pupil diameter of the photographing optical lens assembly is EPD, and they preferably satisfy the relation: $1.60<f/EPD<3.20$. When the above relation is satisfied, the amount of light entering the photographing optical lens assembly is more sufficient, thereby the response speed of the sensor can be increased.

In the aforementioned photographing optical lens assembly, the radius of curvature of the object-side surface of the second lens element is R3, the radius of curvature of the image-side surface of the second lens element is R4, and they preferably satisfy the relation: $3.0<(R3+R4)/(R3-R4)<7.0$. The above relation facilitates the correction of the astigmatism of the photographing optical lens assembly.

The aforementioned photographing optical lens assembly further comprises an electronic sensor for image formation of an imaged object. The spacing near the optical axis between the object-side surface of the first lens element and the electronic sensor is TTL, half of the diagonal length of the effective pixel area of the electronic sensor is ImgH, and they preferably satisfy the relation: $TTL/ImgH<2.10$. The above relation enables the photographing optical lens assembly to maintain a compact form so that it can be equipped in compact portable electronic products.

The present invention provides another photographing optical lens assembly comprising, in order from the object side to the image side: a first lens element with positive refractive power having a convex object-side surface and a convex image-side surface; a second lens element with positive refractive power having a concave object-side surface and a convex image-side surface, the object-side and image-side surfaces thereof being aspheric; a third lens element with negative refractive power having a concave image-side surface on which at least one inflection point is formed, the object-side and image-side surfaces thereof being aspheric; and a stop disposed between an imaged object and the second lens element; wherein there are only three lens elements with refractive power; and wherein the thickness of the second lens element near the optical axis is CT2, the focal length of the photographing optical lens assembly is f, the radius of curvature of the object-side surface of the first lens element is R1, the radius of curvature of the image-side surface of the first lens element is R2, the Abbe number of the first lens element is V1, the Abbe number of the second lens element is V2, the Abbe number of the third lens element is V3, and they satisfy the relations: $0.05<CT2/f<0.19$, $-10.0<(R1/R2)*10<-0.61$, $|V1-V2|<35$, $|V1-V3|<35$, $0.25<R1/f<0.63$.

When the relation of $0.05<CT2/f<0.19$ is satisfied, the lens elements can be placed closer to each other to keep the lens assembly compact, and the moldability and homogeneity of the plastic-injection-molded lenses can be improved. When the relation of $-10.0<(R1/R2)*10<-0.61$ is satisfied, the spherical aberration of the optical system can be favorably corrected. Preferably, R1 and R2 satisfy the relation: $-10.0<(R1/R2)*10<-2.0$. When the relations of $|V1-V2|<35$ and $|V1-V3|<35$ are satisfied, the astigmatism of the photographing optical lens assembly can be corrected favorably to improve the resolution. Preferably, V1, V2 and V3 satisfy the relations: |V1−V2|<15, |V1−V3 |<15. When the relation of 0.25<R1/f<0.63 is satisfied, the total track length of the photographing optical lens assembly can be effectively reduced, and the high order aberrations can be prevented from becoming too large. Preferably, R1 and f satisfy the relation: 0.30<R1/f<0.50.

In the aforementioned photographing optical lens assembly, it is preferred that at least one of the object-side and image-side surfaces of the first lens element is aspheric. Aspheric surfaces can be easily made into non-spherical profiles, allowing more design parameter freedom which can be used to reduce aberrations and the number of the lens elements, so that the total track length of the optical system can be effectively reduced and the image quality can be improved as well. Preferably, the third lens element has a convex object-side surface so as to effectively correct the high order aberrations of the optical system.

In the aforementioned photographing optical lens assembly, the refractive index of the first lens element is N1, the refractive index of the second lens element is N2, the refractive index of the third lens element is N3, and they preferably satisfy the relations: 1.52<N1<1.58, 1.52<<1.58, 1.52<N3<1.58. The above relations are favorable for selecting an appropriate optical plastic material for the first, second and third lens elements.

The aforementioned photographing optical lens assembly is provided with a stop and an electronic sensor for image formation of an imaged object. It is preferred that the stop is disposed between the imaged object and the first lens element so that the telecentric feature is emphasized, resulting in a shorter total track length. The spacing near the optical axis between the stop and the electronic sensor is SL, the spacing near the optical axis between the object-side surface of the first lens element and the electronic sensor is TTL, and they preferably satisfy the relation: 0.93<SL/TTL<1.07. When the above relation is satisfied, the telecentric feature of the photographing optical lens assembly can be secured, thereby effectively reducing the total track length of the optical system.

In the present photographing optical lens assembly, the lens elements can be made of glass or plastic material. If the lens elements are made of glass, there is more freedom in distributing the refractive power of the optical system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the photographing optical lens assembly can be reduced effectively.

In the present photographing optical lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
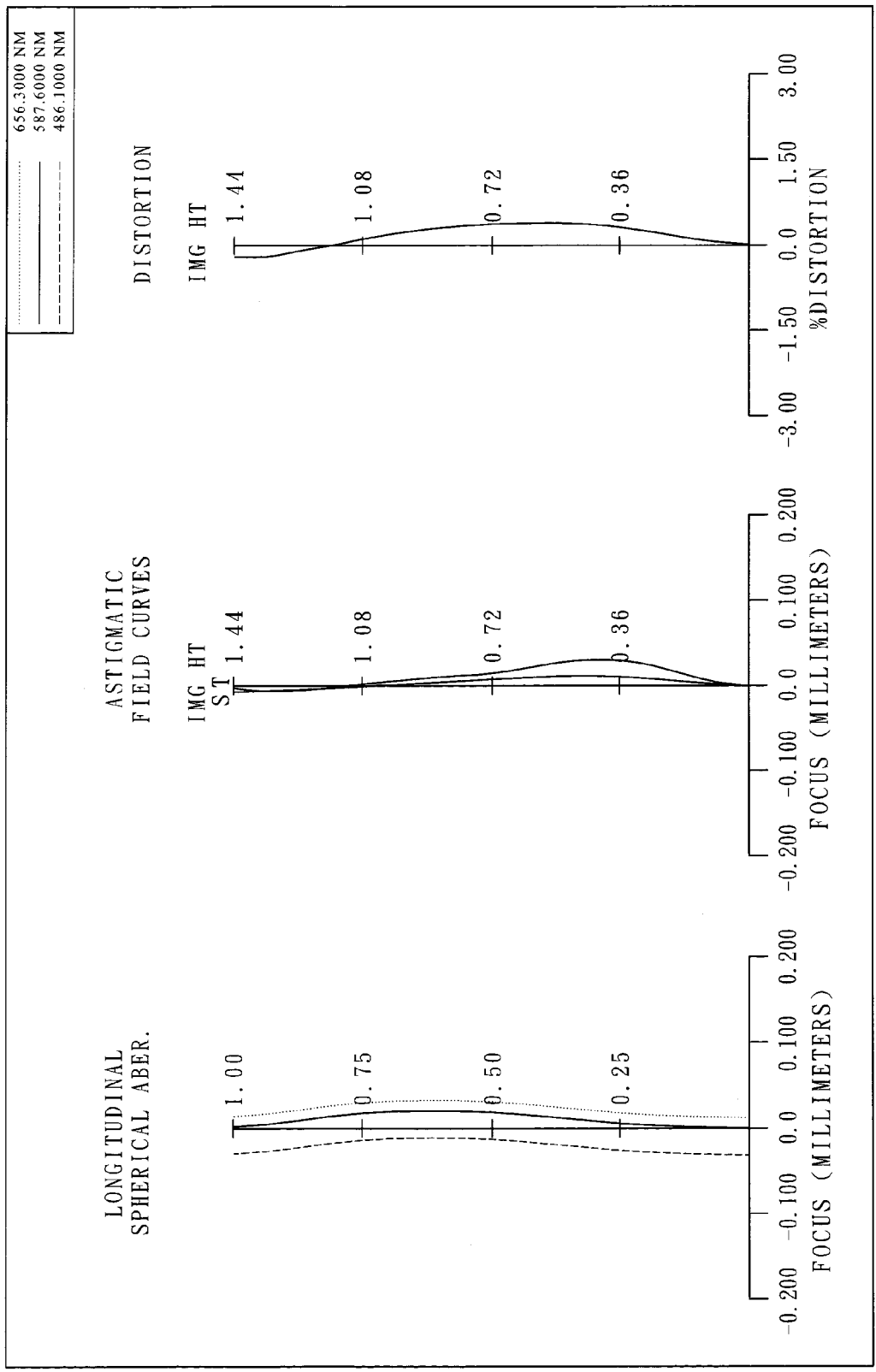
FIG. 1B shows the aberration curves of the first embodiment of the present invention.

FIG. 1A shows a photographing optical lens assembly in accordance with a first embodiment of the present invention, and FIG. 1B shows the aberration curves of the first embodiment of the present invention. The photographing optical lens assembly of the first embodiment of the present invention mainly comprises three lens elements, in order from an object side to an image side: a plastic first lens element 100 with positive refractive power having a convex object-side surface 101 and a convex image-side surface 102, the object-side and image-side surfaces 101 and 102 thereof being aspheric; a plastic second lens element 110 with positive refractive power having a concave object-side surface 111 and a convex image-side surface 112, the object-side and image-side surfaces 111 and 112 thereof being aspheric; and a plastic third lens element 120 with negative refractive power having a convex object-side surface 121 and a concave image-side surface 122 on which at least one inflection point is formed, the object-side and image-side surfaces 121 and 122 thereof being aspheric; wherein a stop 130 is disposed between an imaged object and the first lens element 100; wherein an IR filter 140 is disposed between the image-side surface 122 of the third lens element 120 and an image plane 160, and a cover glass 150 is disposed between the IR filter 140 and the image plane 160; and wherein the IR filter 140 and the cover glass 150 are made of glass and have no influence on the focal length of the photographing optical lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical lens assembly, the focal length of the photographing optical lens assembly is f, and it satisfies the relation: f=2.51 (mm).

In the first embodiment of the present photographing optical lens assembly, the f-number of the photographing optical lens assembly is Fno, and it satisfies the relation: Fno=2.84.

In the first embodiment of the present photographing optical lens assembly, half of the maximal field of view of the photographing optical lens assembly is HFOV, and it satisfies the relation: HFOV=30.0 deg.

In the first embodiment of the present photographing optical lens assembly, the Abbe number of the first lens element 100 is V1, the Abbe number of the second lens element 110 is V2, the Abbe number of the third lens element 120 is V3, and they satisfy the relations: |V1−V2|=0.0, |V1−V3|=0.0.

In the first embodiment of the present photographing optical lens assembly, the thickness of the first lens element 100 near the optical axis is CT1, the thickness of the second lens element 110 near the optical axis is CT2, and they satisfy the relations: CT1=0.448 mm, CT2=0.375 mm.

In the first embodiment of the present photographing optical lens assembly, the radius of curvature of the object-side surface 101 of the first lens element 100 is R1, the radius of curvature of the image-side surface 102 of the first lens element 100 is R2, and they satisfy the relation: (R1/R2)*10=−2.87.

In the first embodiment of the present photographing optical lens assembly, the focal length of the photographing optical lens assembly is f, the focal length of the first lens element 100 is f1, and they satisfy the relation: f/f1=1.02.

In the first embodiment of the present photographing optical lens assembly, the thickness of the second lens element 110 near the optical axis is CT2, the focal length of the photographing optical lens assembly is f, and they satisfy the relation: CT2/f=0.15.

In the first embodiment of the present photographing optical lens assembly, the image plane 160 is provided with an electronic sensor for image formation of an imaged object. The spacing near the optical axis between the stop 130 and the electronic sensor is SL, the spacing near the optical axis between the object-side surface 101 of the first lens element 100 and the electronic sensor is TTL, and they satisfy the relation: SL/TTL=0.99.

In the first embodiment of the present photographing optical lens assembly, the radius of curvature of the object-side surface 101 of the first lens element 100 is R1, the focal length of the photographing optical lens assembly is f, and they satisfy the relation: R1/f=0.67.

In the first embodiment of the present photographing optical lens assembly, the refractive index of the first lens element 100 is N1, the refractive index of the second lens element 110 is N2, the refractive index of the third lens element 120 is N3, and they satisfy the relations: N1=1.544, N2=1.544, N3=1.544.

In the first embodiment of the present photographing optical lens assembly, the focal length of the photographing optical lens assembly is f, the focal length of the second lens element 110 is f2, and they satisfy the relation: f/f2=0.88.

In the first embodiment of the present photographing optical lens assembly, the focal length of the second lens element 110 is f2, the focal length of the third lens element 120 is f3, and they satisfy the relation: f2/f3=−1.00.

In the first embodiment of the present photographing optical lens assembly, the focal length of the photographing optical lens assembly is f, the entrance pupil diameter of the photographing optical lens assembly is EPD, and they satisfy the relation: f/EPD=2.84.

In the first embodiment of the present photographing optical lens assembly, the radius of curvature of the object-side surface 111 of the second lens element 110 is R3, the radius of curvature of the image-side surface 112 of the second lens element 110 is R4, and they satisfy the relation: (R3+R4)/(R3−R4)=10.90.

In the first embodiment of the present photographing optical lens assembly, the image plane 160 is provided with an electronic sensor for image formation of an imaged object. The spacing near the optical axis between the object-side surface 101 of the first lens element 100 and the electronic sensor is TTL, half of the diagonal length of the effective pixel area of the electronic sensor is ImgH, and they satisfy the relation: TTL/ImgH=2.16.

The detailed optical data of the first embodiment is shown in FIG. 7 (TABLE 1), and the aspheric surface data is shown in FIG. 8 (TABLE 2), wherein the units of the radius of curvature, the thickness and the focal length are expressed in mm, and HFOV is half of the maximal field of view.

Figure 2A:
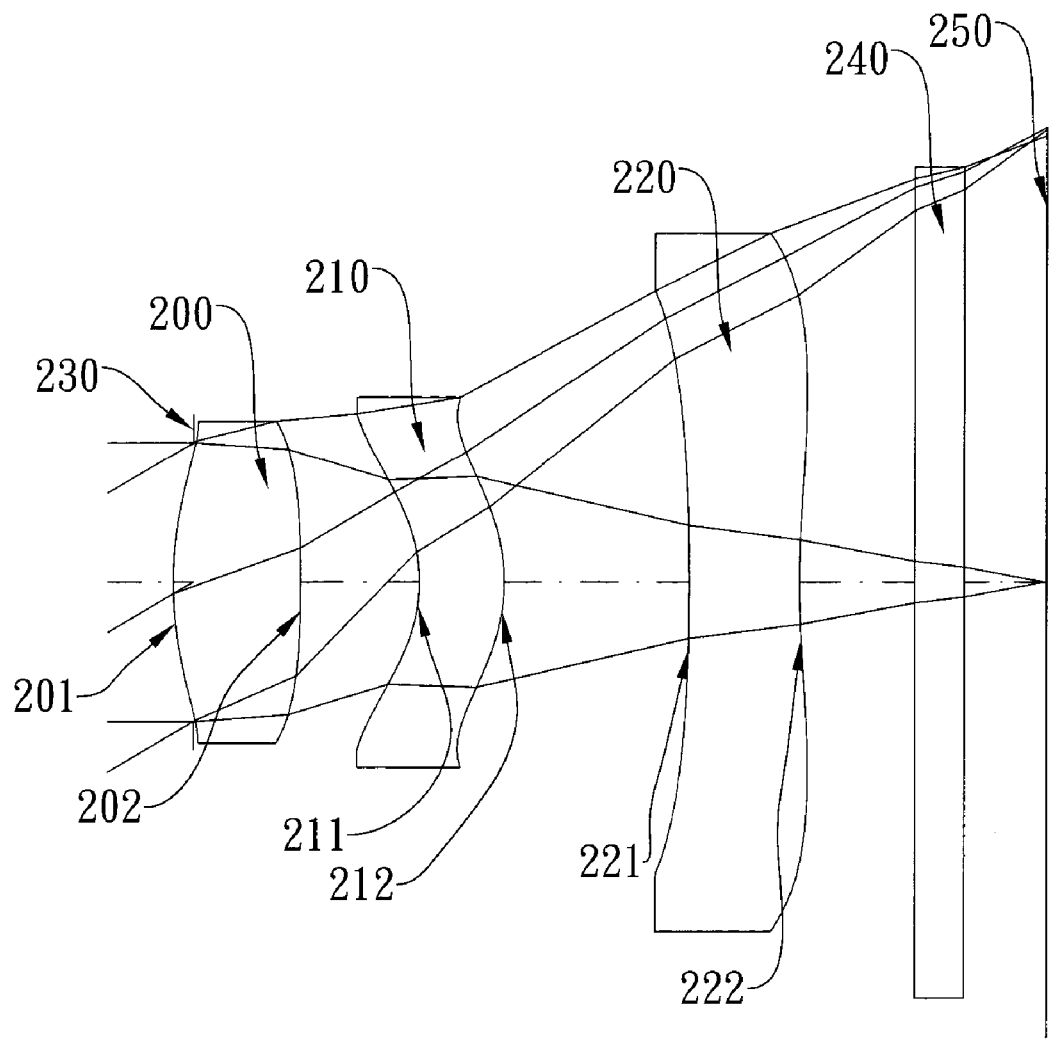
FIG. 2A shows a photographing optical lens assembly in accordance with a second embodiment of the present invention.
Figure 2B:
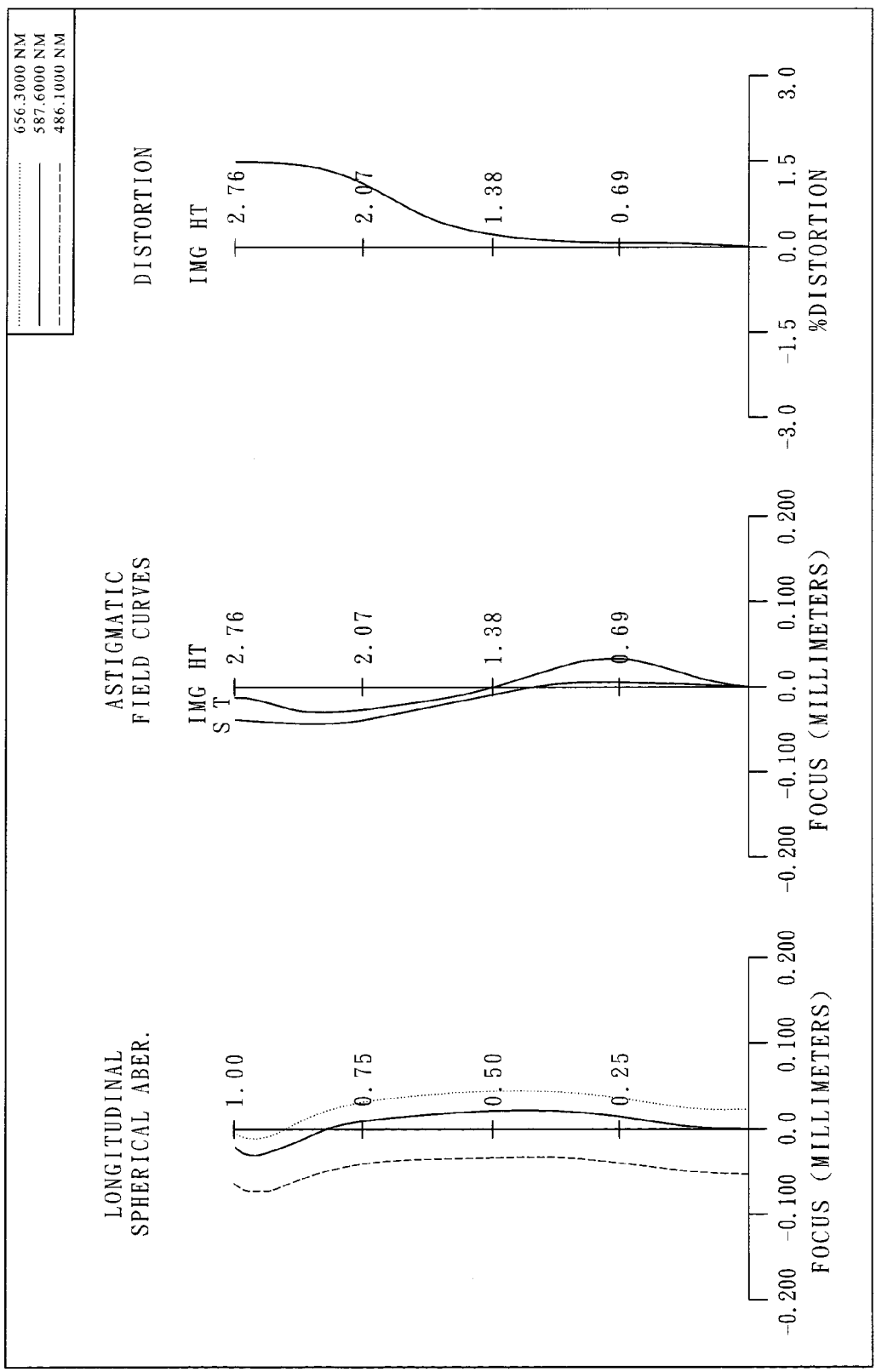
FIG. 2B shows the aberration curves of the second embodiment of the present invention.

FIG. 2A shows a photographing optical lens assembly in accordance with a second embodiment of the present invention, and FIG. 2B shows the aberration curves of the second embodiment of the present invention. The photographing optical lens assembly of the second embodiment of the present invention mainly comprises three lens elements, in order from the object side to the image side: a plastic first lens element 200 with positive refractive power having a convex object-side surface 201 and a convex image-side surface 202, the object-side and image-side surfaces 201 and 202 thereof being aspheric; a plastic second lens element 210 with positive refractive power having a concave object-side surface 211 and a convex image-side surface 212, the object-side and image-side surfaces 211 and 212 thereof being aspheric; and a plastic third lens element 220 with negative refractive power having a concave object-side surface 221 and a concave image-side surface 222 on which at least one inflection point is formed, the object-side and image-side surfaces 221 and 222 thereof being aspheric; wherein a stop 230 is disposed between an imaged object and the first lens element 200; wherein an IR filter 240 is disposed between the image-side surface 222 of the third lens element 220 and an image plane 250; and wherein the IR filter 240 is made of glass and has no influence on the focal length of the photographing optical lens assembly.

The equation of the aspheric surface profiles of the second embodiment has the same form as that of the first embodiment.

In the second embodiment of the present photographing optical lens assembly, the focal length of the photographing optical lens assembly is f, and it satisfies the relation: f=4.64 (mm).

In the second embodiment of the present photographing optical lens assembly, the f-number of the photographing optical lens assembly is Fno, and it satisfies the relation: Fno=2.73.

In the second embodiment of the present photographing optical lens assembly, half of the maximal field of view of the photographing optical lens assembly is HFOV, and it satisfies the relation: HFOV=30.5 deg.

In the second embodiment of the present photographing optical lens assembly, the Abbe number of the first lens element 200 is V1, the Abbe number of the second lens element 210 is V2, the Abbe number of the third lens element 220 is V3, and they satisfy the relations: |V1−V2|=25.7, |V1−V3|=32.5.

In the second embodiment of the present photographing optical lens assembly, the thickness of the first lens element 200 near the optical axis is CT1, the thickness of the second lens element 210 near the optical axis is CT2, and they satisfy the relations: CT1=0.770 mm, CT2=0.517 mm.

In the second embodiment of the present photographing optical lens assembly, the radius of curvature of the object-side surface 201 of the first lens element 200 is R1, the radius of curvature of the image-side surface 202 of the first lens element 200 is R2, and they satisfy the relation: (R1/R2)*10=−2.45.

In the second embodiment of the present photographing optical lens assembly, the focal length of the photographing optical lens assembly is f, the focal length of the first lens element 200 is f1, and they satisfy the relation: f/f1=1.36.

In the second embodiment of the present photographing optical lens assembly, the thickness of the second lens element 210 near the optical axis is CT2, the focal length of the photographing optical lens assembly is f, and they satisfy the relation: CT2/f=0.11.

In the second embodiment of the present photographing optical lens assembly, the image plane 250 is provided with an electronic sensor for image formation of an imaged object. The spacing near the optical axis between the stop 230 and the electronic sensor is SL, the spacing near the optical axis between the object-side surface 201 of the first lens element 200 and the electronic sensor is TTL, and they satisfy the relation: SL/TTL=0.98.

In the second embodiment of the present photographing optical lens assembly, the radius of curvature of the object-side surface 201 of the first lens element 200 is R1, the focal length of the photographing optical lens assembly is f, and they satisfy the relation: R1/f=0.49.

In the second embodiment of the present photographing optical lens assembly, the refractive index of the first lens element 200 is N1, the refractive index of the second lens element 210 is N2, the refractive index of the third lens element 220 is N3, and they satisfy the relations: N1=1.544, N2=1.583, N3=1.632.

In the second embodiment of the present photographing optical lens assembly, the focal length of the photographing optical lens assembly is f, the focal length of the second lens element 210 is f2, and they satisfy the relation: f/f2=0.15.

In the second embodiment of the present photographing optical lens assembly, the focal length of the second lens element 210 is f2, the focal length of the third lens element 220 is f3, and they satisfy the relation: f2/f3=−4.67.

In the second embodiment of the present photographing optical lens assembly, the focal length of the photographing optical lens assembly is f, the entrance pupil diameter of the photographing optical lens assembly is EPD, and they satisfy the relation: f/EPD=2.73.

In the second embodiment of the present photographing optical lens assembly, the radius of curvature of the object-side surface 211 of the second lens element 210 is R3, the radius of curvature of the image-side surface 212 of the second lens element 210 is R4, and they satisfy the relation: (R3+R4)/(R3−R4)=−16.31.

In the second embodiment of the present photographing optical lens assembly, the image plane 250 is provided with an electronic sensor for image formation of an imaged object. The spacing near the optical axis between the object-side surface 201 of the first lens element 200 and the electronic sensor is TTL, half of the diagonal length of the effective pixel area of the electronic sensor is ImgH, and they satisfy the relation: TTL/ImgH=1.88.

The detailed optical data of the second embodiment is shown in FIG. 9 (TABLE 3), and the aspheric surface data is shown in FIG. 10 (TABLE 4), wherein the units of the radius of curvature, the thickness and the focal length are expressed in mm, and HFOV is half of the maximal field of view.

Figure 3A:
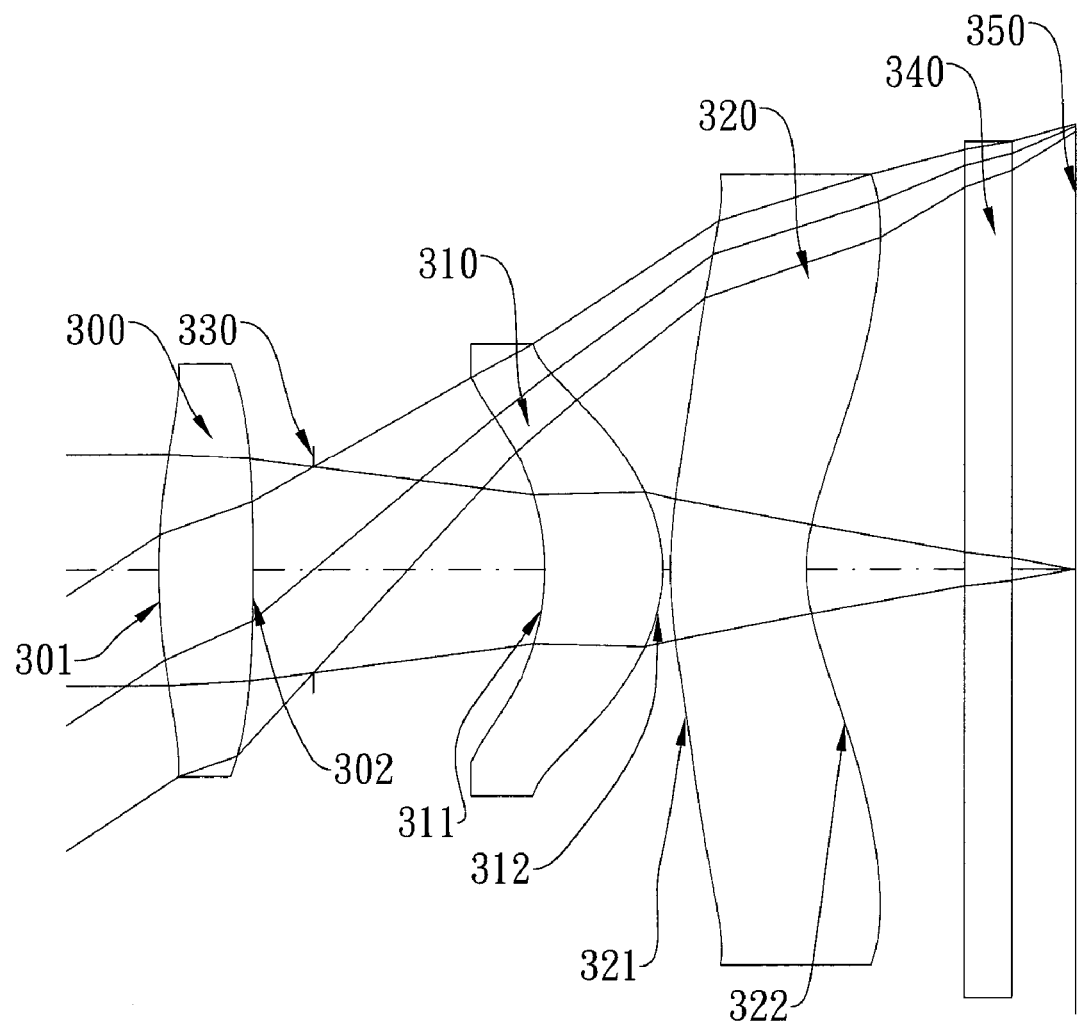
FIG. 3A shows a photographing optical lens assembly in accordance with a third embodiment of the present invention.
Figure 3B:
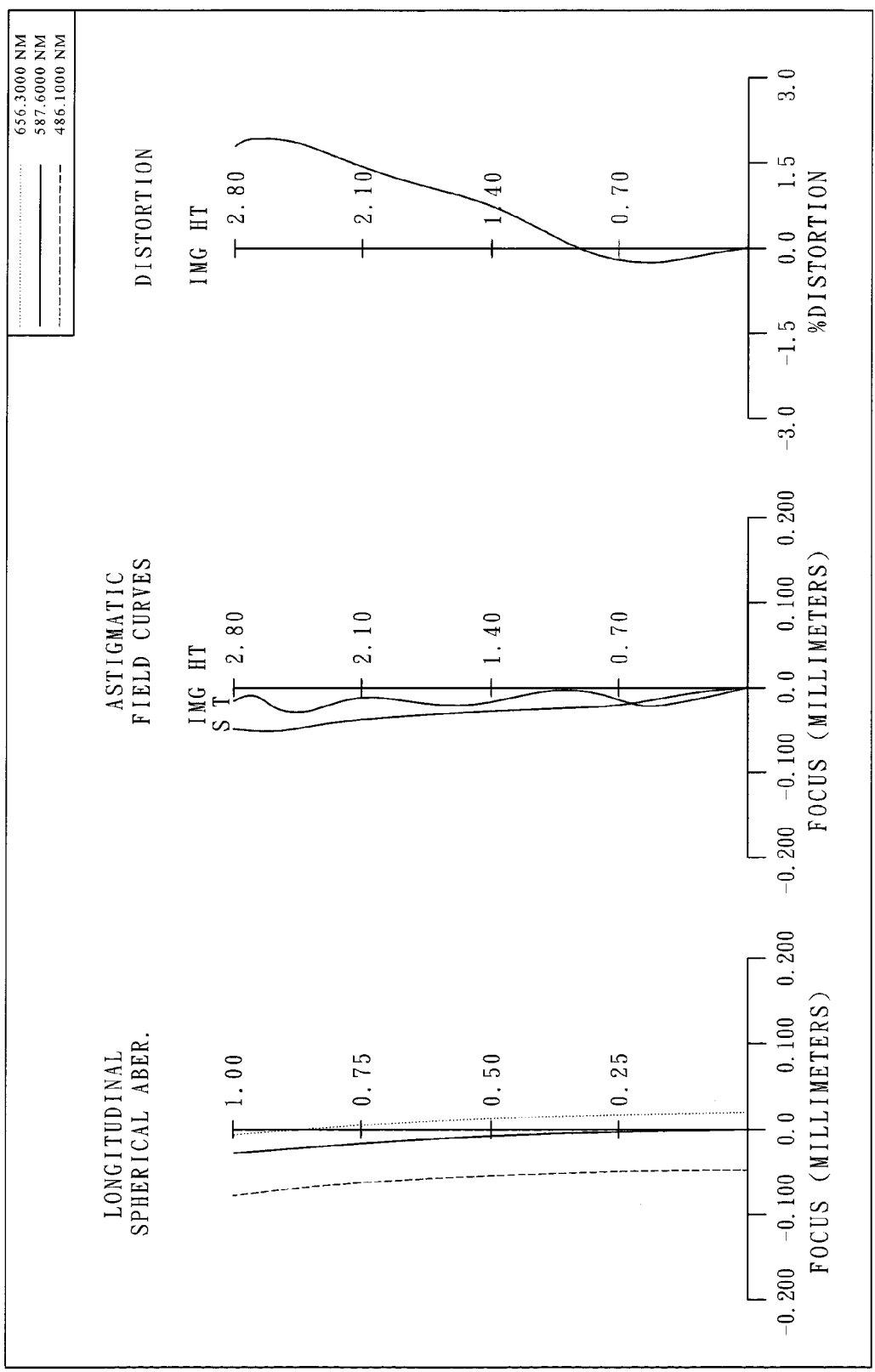
FIG. 3B shows the aberration curves of the third embodiment of the present invention.

FIG. 3A shows a photographing optical lens assembly in accordance with a third embodiment of the present invention, and FIG. 3B shows the aberration curves of the third embodiment of the present invention. The photographing optical lens assembly of the third embodiment of the present invention mainly comprises three lens elements, in order from the object side to the image side: a plastic first lens element 300 with positive refractive power having a convex object-side surface 301 and a convex image-side surface 302, the object-side and image-side surfaces 301 and 302 thereof being aspheric; a plastic second lens element 310 with positive refractive power having a concave object-side surface 311 and a convex image-side surface 312, the object-side and image-side surfaces 311 and 312 thereof being aspheric; and a plastic third lens element 320 with negative refractive power having a convex object-side surface 321 and a concave image-side surface 322 on which at least one inflection point is formed, the object-side and image-side surfaces 321 and 322 thereof being aspheric; wherein a stop 330 is disposed between the first lens element 300 and the second lens element 310; wherein an IR filter 340 is disposed between the image-side surface 322 of the third lens element 320 and an image plane 350; and wherein the IR filter 340 is made of glass and has no influence on the focal length of the photographing optical lens assembly.

The equation of the aspheric surface profiles of the third embodiment has the same form as that of the first embodiment.

In the third embodiment of the present photographing optical lens assembly, the focal length of the photographing optical lens assembly is f, and it satisfies the relation: f=4.17 (mm).

In the third embodiment of the present photographing optical lens assembly, the f-number of the photographing optical lens assembly is Fno, and it satisfies the relation: Fno=2.85.

In the third embodiment of the present photographing optical lens assembly, half of the maximal field of view of the photographing optical lens assembly is HFOV, and it satisfies the relation: HFOV=33.5 deg.

In the third embodiment of the present photographing optical lens assembly, the Abbe number of the first lens element 300 is V1, the Abbe number of the second lens element 310 is V2, the Abbe number of the third lens element 320 is V3, and they satisfy the relations: |V1−V2|=0.0, |V1−V3|=0.0.

In the third embodiment of the present photographing optical lens assembly, the thickness of the first lens element 300 near the optical axis is CT1, the thickness of the second lens element 310 near the optical axis is CT2, and they satisfy the relations: CT1=0.597 mm, CT2=0.745 mm.

In the third embodiment of the present photographing optical lens assembly, the radius of curvature of the object-side surface 301 of the first lens element 300 is R1, the radius of curvature of the image-side surface 302 of the first lens element 300 is R2, and they satisfy the relation: (R1/R2)*10=−2.72.

In the third embodiment of the present photographing optical lens assembly, the focal length of the photographing optical lens assembly is f, the focal length of the first lens element 300 is f1, and they satisfy the relation: f/f1=0.73.

In the third embodiment of the present photographing optical lens assembly, the thickness of the second lens element 310 near the optical axis is CT2, the focal length of the photographing optical lens assembly is f, and they satisfy the relation: CT2/f=0.18.

In the third embodiment of the present photographing optical lens assembly, the image plane 350 is provided with an electronic sensor for image formation of an imaged object. The spacing near the optical axis between the stop 330 and the electronic sensor is SL, the spacing near the optical axis between the object-side surface 301 of the first lens element 300 and the electronic sensor is TTL, and they satisfy the relation: SL/TTL=0.83.

In the third embodiment of the present photographing optical lens assembly, the radius of curvature of the object-side surface 301 of the first lens element 300 is R1, the focal length of the photographing optical lens assembly is f, and they satisfy the relation: R1/f=0.93.

In the third embodiment of the present photographing optical lens assembly, the refractive index of the first lens element 300 is N1, the refractive index of the second lens element 310 is N2, the refractive index of the third lens element 320 is N3, and they satisfy the relations: N1=1.544, N2=1.544, N3=1.544.

In the third embodiment of the present photographing optical lens assembly, the focal length of the photographing optical lens assembly is f, the focal length of the second lens element 310 is f2, and they satisfy the relation: f/f2=1.12.

In the third embodiment of the present photographing optical lens assembly, the focal length of the second lens element 310 is f2, the focal length of the third lens element 320 is f3, and they satisfy the relation: f2/f3=−0.81.

In the third embodiment of the present photographing optical lens assembly, the focal length of the photographing optical lens assembly is f, the entrance pupil diameter of the photographing optical lens assembly is EPD, and they satisfy the relation: f/EPD=2.85.

In the third embodiment of the present photographing optical lens assembly, the radius of curvature of the object-side surface 311 of the second lens element 310 is R3, the radius of curvature of the image-side surface 312 of the second lens element 310 is R4, and they satisfy the relation: (R3+R4)/(R3−R4)=4.75.

In the third embodiment of the present photographing optical lens assembly, the image plane 350 is provided with an electronic sensor for image formation of an imaged object. The spacing near the optical axis between the object-side surface 301 of the first lens element 300 and the electronic sensor is TTL, half of the diagonal length of the effective pixel area of the electronic sensor is ImgH, and they satisfy the relation: TTL/ImgH=2.04.

The detailed optical data of the third embodiment is shown in FIG. 11 (TABLE 5), and the aspheric surface data is shown in FIG. 12 (TABLE 6), wherein the units of the radius of curvature, the thickness and the focal length are expressed in mm, and HFOV is half of the maximal field of view.

Figure 4A:
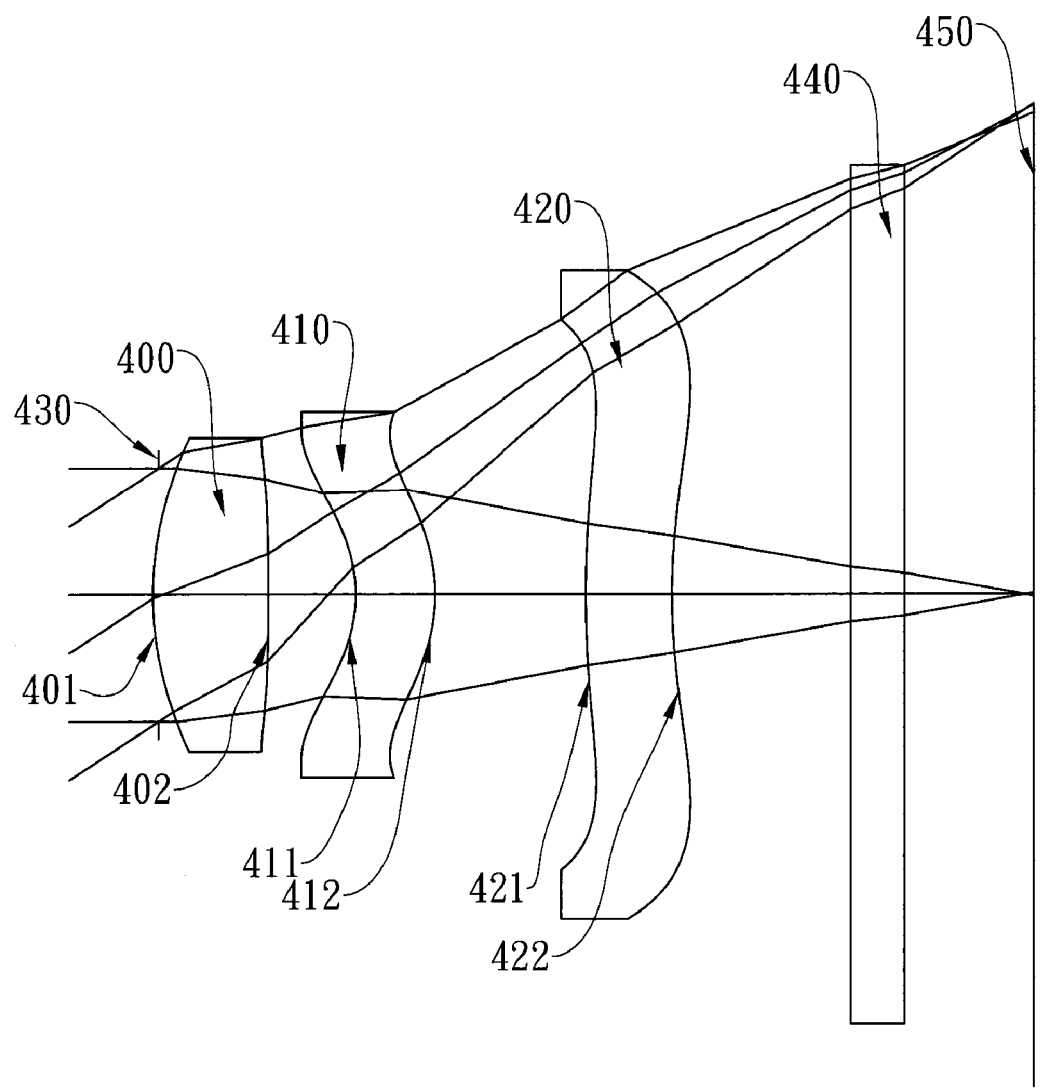
FIG. 4A shows a photographing optical lens assembly in accordance with a fourth embodiment of the present invention.
Figure 4B:
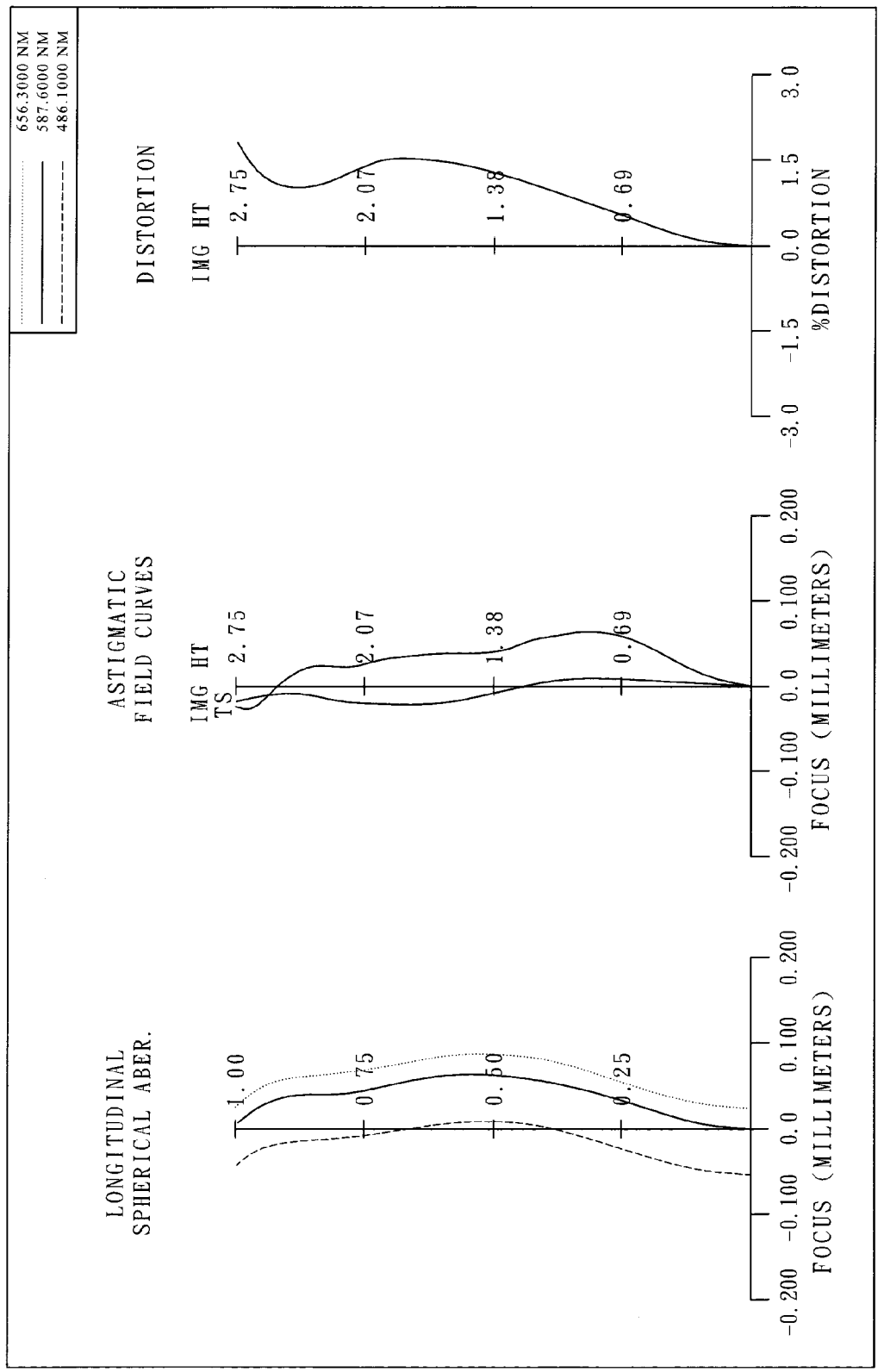
FIG. 4B shows the aberration curves of the fourth embodiment of the present invention.

FIG. 4A shows a photographing optical lens assembly in accordance with a fourth embodiment of the present invention, and FIG. 4B shows the aberration curves of the fourth embodiment of the present invention. The photographing optical lens assembly of the fourth embodiment of the present invention mainly comprises three lens elements, in order from the object side to the image side: a plastic first lens element 400 with positive refractive power having a convex object-side surface 401 and a convex image-side surface 402, the object-side and image-side surfaces 401 and 402 thereof being aspheric; a plastic second lens element 410 with positive refractive power having a concave object-side surface 411 and a convex image-side surface 412, the object-side and image-side surfaces 411 and 412 thereof being aspheric; and a plastic third lens element 420 with negative refractive power having a convex object-side surface 421 and a concave image-side surface 422 on which at least one inflection point is formed, the object-side and image-side surfaces 421 and 422 thereof being aspheric; wherein a stop 430 is disposed between an imaged object and the first lens element 400; wherein an IR filter 440 is disposed between the image-side surface 422 of the third lens element 420 and an image plane 450; and wherein the IR filter 440 is made of glass and has no influence on the focal length of the photographing optical lens assembly.

The equation of the aspheric surface profiles of the fourth embodiment has the same form as that of the first embodiment.

In the fourth embodiment of the present photographing optical lens assembly, the focal length of the photographing optical lens assembly is f, and it satisfies the relation: f=4.13 (mm).

In the fourth embodiment of the present photographing optical lens assembly, the f-number of the photographing optical lens assembly is Fno, and it satisfies the relation: Fno=2.85.

In the fourth embodiment of the present photographing optical lens assembly, half of the maximal field of view of the photographing optical lens assembly is HFOV, and it satisfies the relation: HFOV=33.4 deg.

In the fourth embodiment of the present photographing optical lens assembly, the Abbe number of the first lens element 400 is V1, the Abbe number of the second lens element 410 is V2, the Abbe number of the third lens element 420 is V3, and they satisfy the relations: |V1−V2|=0.1, |V1−V3|=0.1.

In the fourth embodiment of the present photographing optical lens assembly, the thickness of the first lens element 400 near the optical axis is CT1, the thickness of the second lens element 410 near the optical axis is CT2, and they satisfy the relations: CT1=0.647 mm, CT2=0.440 mm.

In the fourth embodiment of the present photographing optical lens assembly, the radius of curvature of the object-side surface 401 of the first lens element 400 is R1, the radius of curvature of the image-side surface 402 of the first lens element 400 is R2, and they satisfy the relation: (R1/R2)*10=−0.88.

In the fourth embodiment of the present photographing optical lens assembly, the focal length of the photographing optical lens assembly is f, the focal length of the first lens element 400 is f1, and they satisfy the relation: f/f1=1.25.

In the fourth embodiment of the present photographing optical lens assembly, the thickness of the second lens element 410 near the optical axis is CT2, the focal length of the photographing optical lens assembly is f, and they satisfy the relation: CT2/f=0.11.

In the fourth embodiment of the present photographing optical lens assembly, the image plane 450 is provided with an electronic sensor for image formation of an imaged object. The spacing near the optical axis between the stop 430 and the electronic sensor is SL, the spacing near the optical axis between the object-side surface 401 of the first lens element 400 and the electronic sensor is TTL, and they satisfy the relation: SL/TTL=0.99.

In the fourth embodiment of the present photographing optical lens assembly, the radius of curvature of the object-side surface 401 of the first lens element 400 is R1, the focal length of the photographing optical lens assembly is f, and they satisfy the relation: R1/f=0.46.

In the fourth embodiment of the present photographing optical lens assembly, the refractive index of the first lens element 400 is N1, the refractive index of the second lens element 410 is N2, the refractive index of the third lens element 420 is N3, and they satisfy the relations: N1=1.530, N2=1.544, N3=1.544.

In the fourth embodiment of the present photographing optical lens assembly, the focal length of the photographing optical lens assembly is f, the focal length of the second lens element 410 is f2, and they satisfy the relation: f/f2=0.07.

In the fourth embodiment of the present photographing optical lens assembly, the focal length of the second lens element 410 is f2, the focal length of the third lens element 420 is f3, and they satisfy the relation: f2/f3=−3.61.

In the fourth embodiment of the present photographing optical lens assembly, the focal length of the photographing optical lens assembly is f, the entrance pupil diameter of the photographing optical lens assembly is EPD, and they satisfy the relation: f/EPD=2.85.

In the fourth embodiment of the present photographing optical lens assembly, the radius of curvature of the object-side surface 411 of the second lens element 410 is R3, the radius of curvature of the image-side surface 412 of the second lens element 410 is R4, and they satisfy the relation: (R3+R4)/(R3−R4)=−13.83.

In the fourth embodiment of the present photographing optical lens assembly, the image plane 450 is provided with an electronic sensor for image formation of an imaged object. The spacing near the optical axis between the object-side surface 401 of the first lens element 400 and the electronic sensor is TTL, half of the diagonal length of the effective pixel area of the electronic sensor is ImgH, and they satisfy the relation: TTL/ImgH=1.75.

The detailed optical data of the fourth embodiment is shown in FIG. 13 (TABLE 7), and the aspheric surface data is shown in FIG. 14 (TABLE 8), wherein the units of the radius of curvature, the thickness and the focal length are expressed in mm, and HFOV is half of the maximal field of view.

Figure 5A:
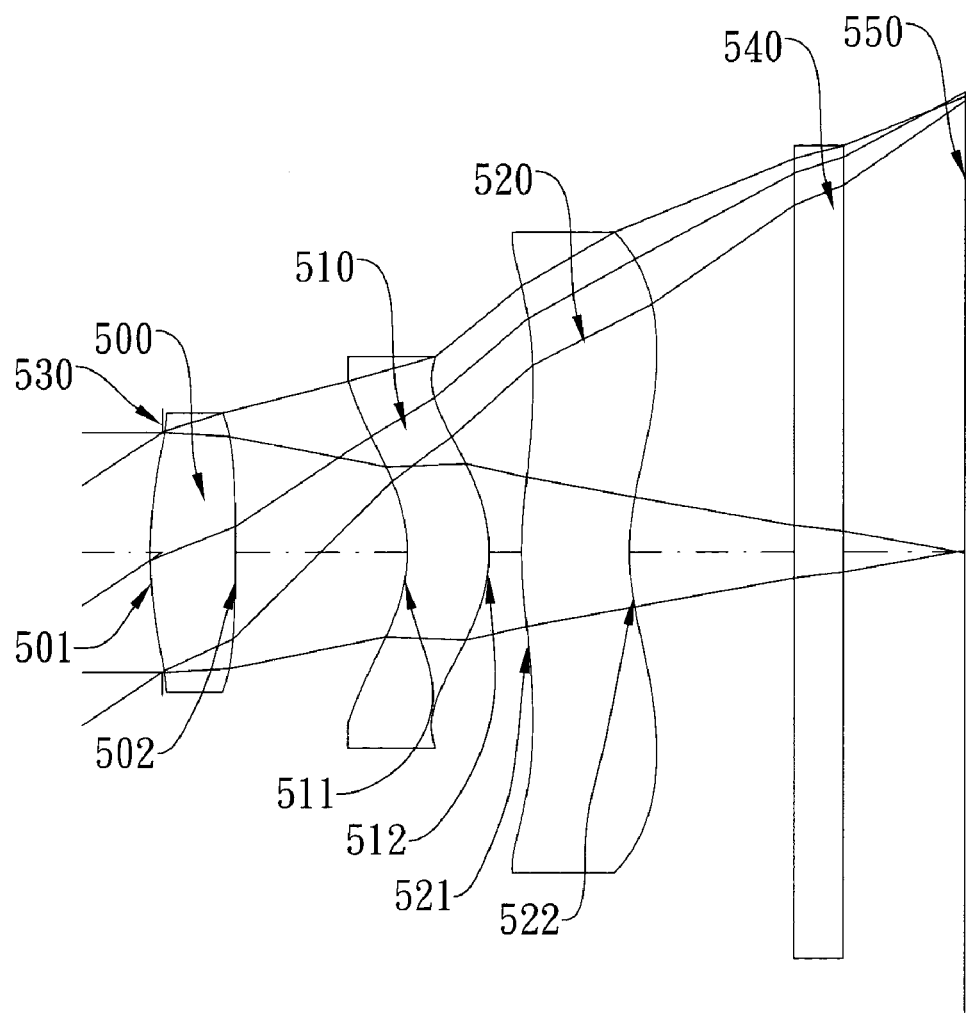
FIG. 5A shows a photographing optical lens assembly in accordance with a fifth embodiment of the present invention.
Figure 5B:
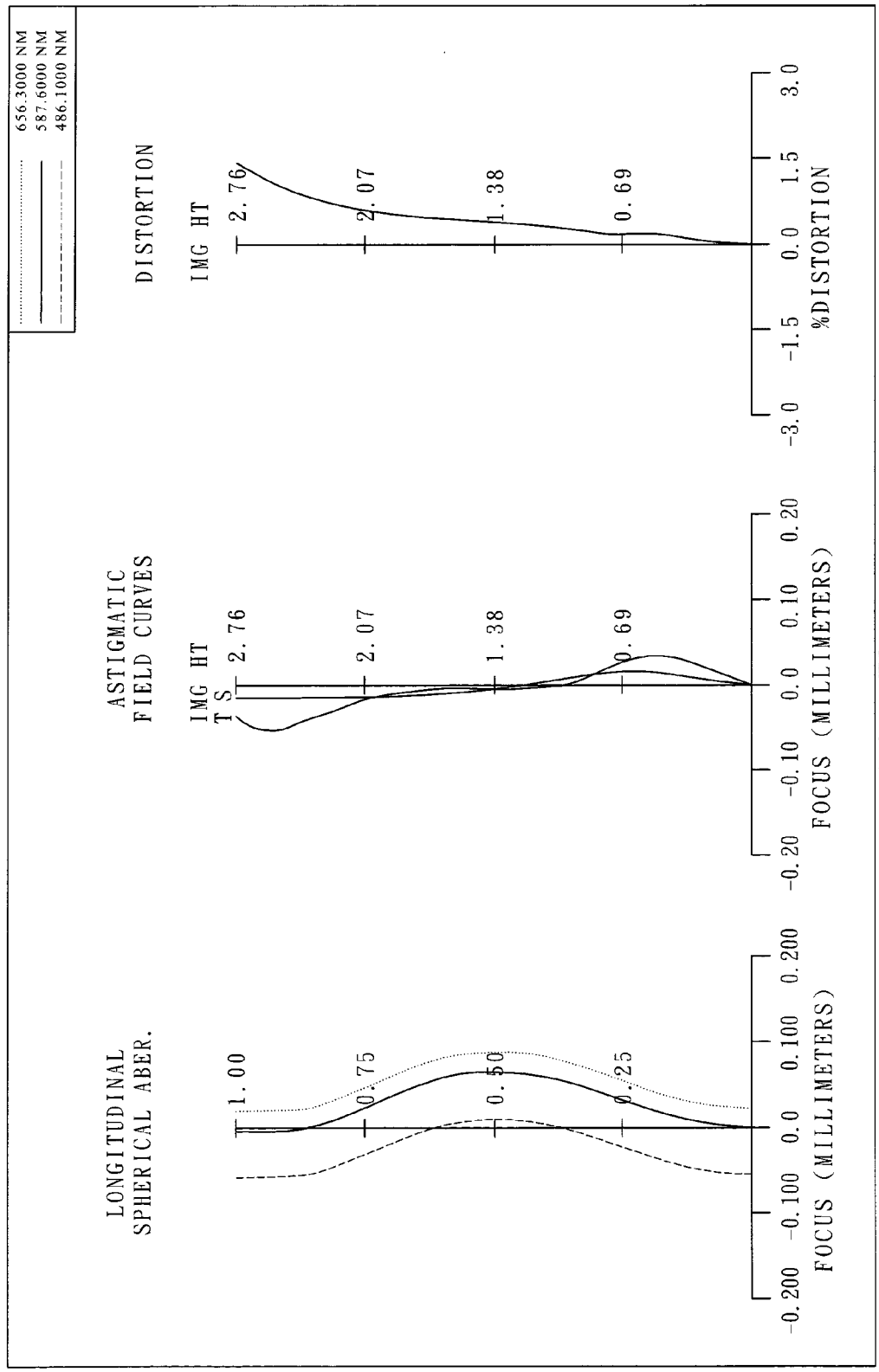
FIG. 5B shows the aberration curves of the fifth embodiment of the present invention.

FIG. 5A shows a photographing optical lens assembly in accordance with a fifth embodiment of the present invention, and FIG. 5B shows the aberration curves of the fifth embodiment of the present invention. The photographing optical lens assembly of the fifth embodiment of the present invention mainly comprises three lens elements, in order from the object side to the image side: a plastic first lens element 500 with positive refractive power having a convex object-side surface 501 and a convex image-side surface 502, the object-side and image-side surfaces 501 and 502 thereof being aspheric; a plastic second lens element 510 with positive refractive power having a concave object-side surface 511 and a convex image-side surface 512, the object-side and image-side surfaces 511 and 512 thereof being aspheric; and a plastic third lens element 520 with negative refractive power having a convex object-side surface 521 and a concave image-side surface 522 on which at least one inflection point is formed, the object-side and image-side surfaces 521 and 522 thereof being aspheric; wherein a stop 530 is disposed between an imaged object and the first lens element 500; wherein an IR filter 540 is disposed between the image-side surface 522 of the third lens element 520 and an image plane 550; and wherein the IR filter 540 is made of glass and has no influence on the focal length of the photographing optical lens assembly.

The equation of the aspheric surface profiles of the fifth embodiment has the same form as that of the first embodiment.

In the fifth embodiment of the present photographing optical lens assembly, the focal length of the photographing optical lens assembly is f, and it satisfies the relation: f=4.16 (mm).

In the fifth embodiment of the present photographing optical lens assembly, the f-number of the photographing optical lens assembly is Fno, and it satisfies the relation: Fno=2.85.

In the fifth embodiment of the present photographing optical lens assembly, half of the maximal field of view of the photographing optical lens assembly is HFOV, and it satisfies the relation: HFOV=33.3 deg.

In the fifth embodiment of the present photographing optical lens assembly, the Abbe number of the first lens element 500 is V1, the Abbe number of the second lens element 510 is V2, the Abbe number of the third lens element 520 is V3, and they satisfy the relations: |V1−V2|=0.1, |V1−V3|=0.9.

In the fifth embodiment of the present photographing optical lens assembly, the thickness of the first lens element 500 near the optical axis is CT1, the thickness of the second lens element 510 near the optical axis is CT2, and they satisfy the relations: CT1=0.518 mm, CT2=0.495 mm.

In the fifth embodiment of the present photographing optical lens assembly, the radius of curvature of the object-side surface 501 of the first lens element 500 is R1, the radius of curvature of the image-side surface 502 of the first lens element 500 is R2, and they satisfy the relation: (R1/R2)*10=−1.90.

In the fifth embodiment of the present photographing optical lens assembly, the focal length of the photographing optical lens assembly is f, the focal length of the first lens element 500 is f1, and they satisfy the relation: f/f1=1.07.

In the fifth embodiment of the present photographing optical lens assembly, the thickness of the second lens element 510 near the optical axis is CT2, the focal length of the photographing optical lens assembly is f, and they satisfy the relation: CT2/f=0.12.

In the fifth embodiment of the present photographing optical lens assembly, the image plane 550 is provided with an electronic sensor for image formation of an imaged object. The spacing near the optical axis between the stop 530 and the electronic sensor is SL, the spacing near the optical axis between the object-side surface 501 of the first lens element 500 and the electronic sensor is TTL, and they satisfy the relation: SL/TTL=0.98.

In the fifth embodiment of the present photographing optical lens assembly, the radius of curvature of the object-side surface 501 of the first lens element 500 is R1, the focal length of the photographing optical lens assembly is f, and they satisfy the relation: R1/f=0.60.

In the fifth embodiment of the present photographing optical lens assembly, the refractive index of the first lens element 500 is N1, the refractive index of the second lens element 510 is N2, the refractive index of the third lens element 520 is N3, and they satisfy the relations: N1=1.544, N2=1.530, N3=1.514.

In the fifth embodiment of the present photographing optical lens assembly, the focal length of the photographing optical lens assembly is f, the focal length of the second lens element 510 is f2, and they satisfy the relation: f/f2=0.46.

In the fifth embodiment of the present photographing optical lens assembly, the focal length of the second lens element 510 is f2, the focal length of the third lens element 520 is f3, and they satisfy the relation: f2/f3=−1.20.

In the fifth embodiment of the present photographing optical lens assembly, the focal length of the photographing optical lens assembly is f, the entrance pupil diameter of the photographing optical lens assembly is EPD, and they satisfy the relation: f/EPD=2.85.

In the fifth embodiment of the present photographing optical lens assembly, the radius of curvature of the object-side surface 511 of the second lens element 510 is R3, the radius of curvature of the image-side surface 512 of the second lens element 510 is R4, and they satisfy the relation: (R3+R4)/(R3−R4)=88.62.

In the fifth embodiment of the present photographing optical lens assembly, the image plane 550 is provided with an electronic sensor for image formation of an imaged object. The spacing near the optical axis between the object-side surface 501 of the first lens element 500 and the electronic sensor is TTL, half of the diagonal length of the effective pixel area of the electronic sensor is ImgH, and they satisfy the relation: TTL/ImgH=1.75.

The detailed optical data of the fifth embodiment is shown in FIG. 15 (TABLE 9), and the aspheric surface data is shown in FIG. 16 (TABLE 10), wherein the units of the radius of curvature, the thickness and the focal length are expressed in mm, and HFOV is half of the maximal field of view.

Figure 6A:
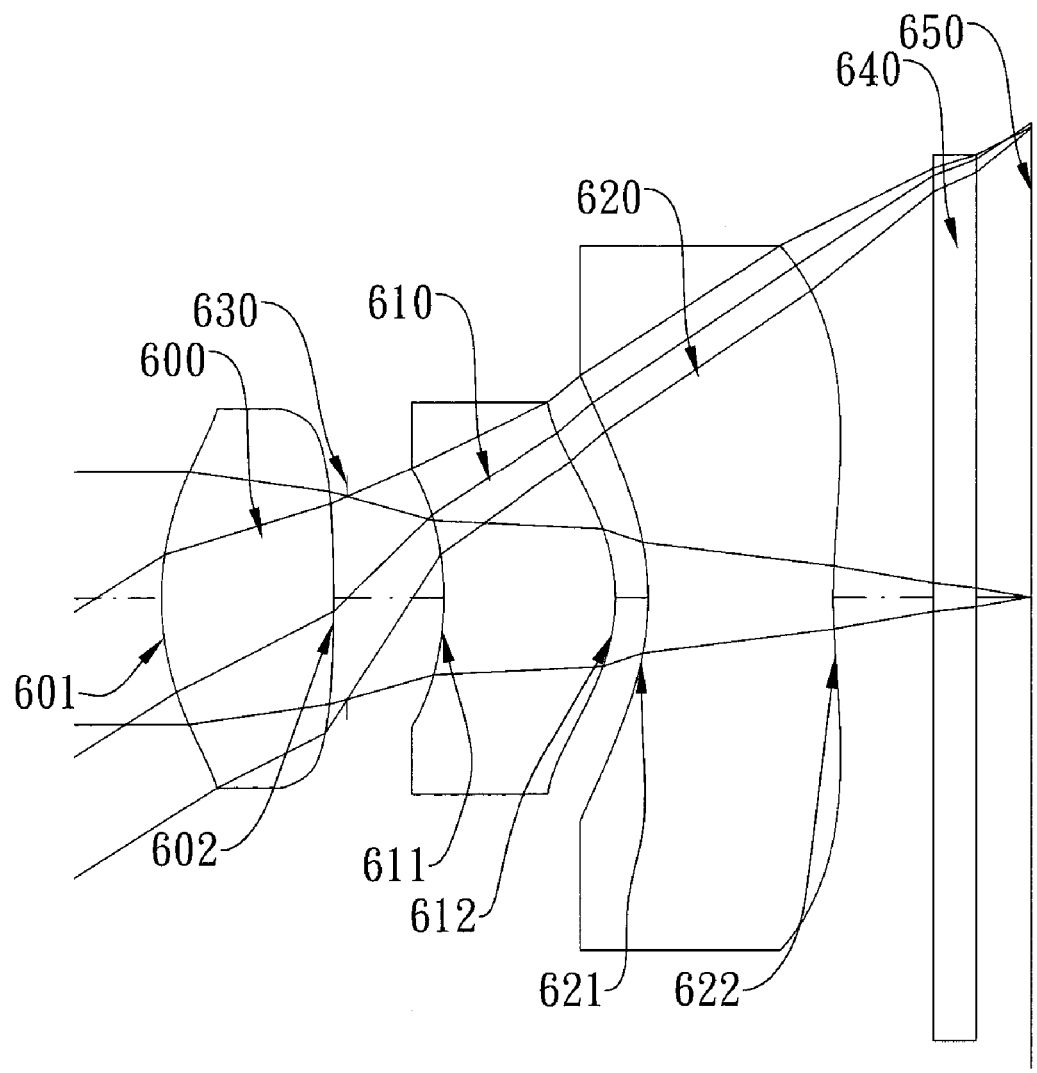
FIG. 6A shows a photographing optical lens assembly in accordance with a sixth embodiment of the present invention.
Figure 6B:
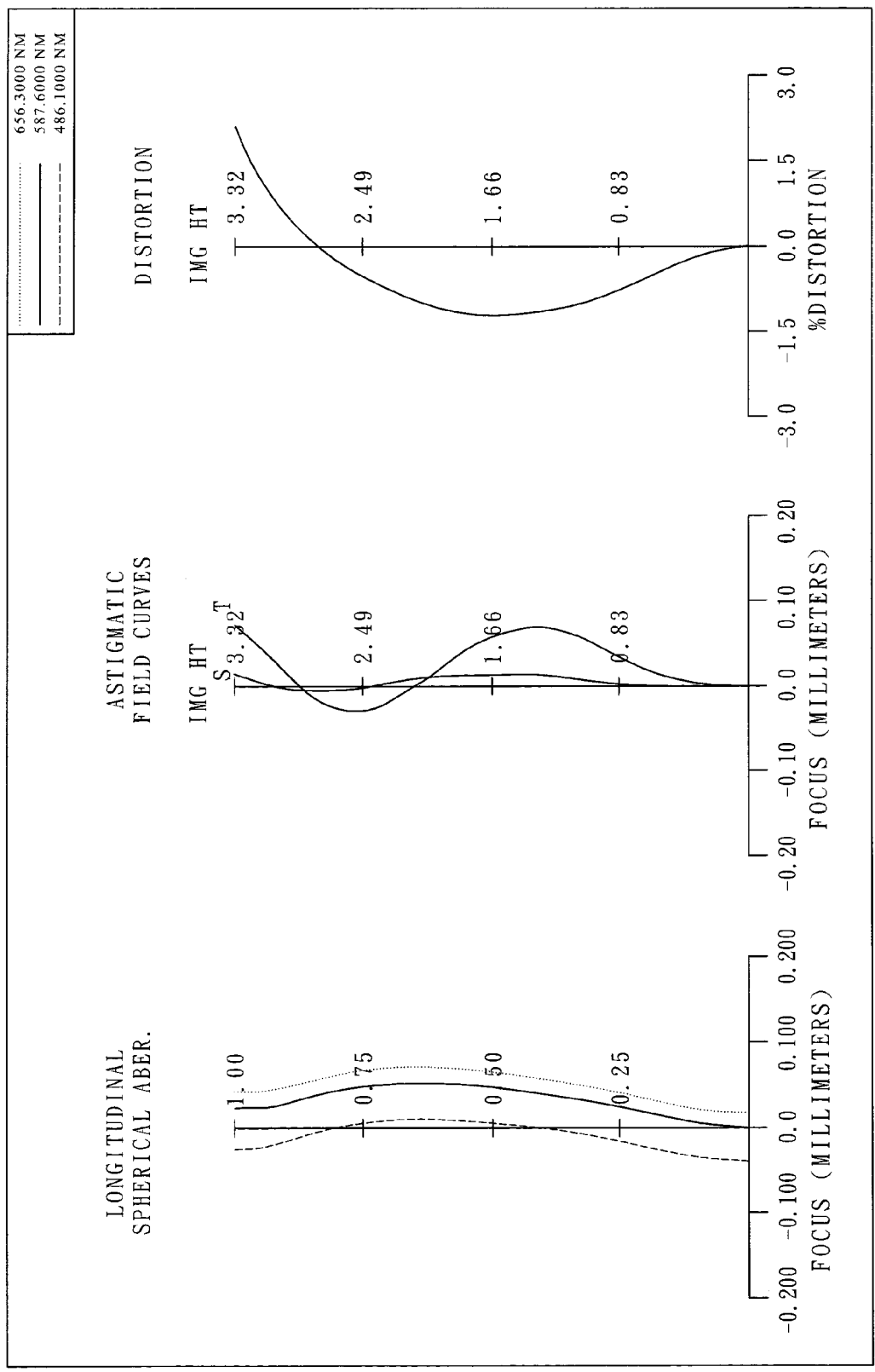
FIG. 6B shows the aberration curves of the sixth embodiment of the present invention.

FIG. 6A shows a photographing optical lens assembly in accordance with a sixth embodiment of the present invention, and FIG. 6B shows the aberration curves of the sixth embodiment of the present invention. The photographing optical lens assembly of the sixth embodiment of the present invention mainly comprises three lens elements, in order from the object side to the image side: a plastic first lens element 600 with positive refractive power having a convex object-side surface 601 and a convex image-side surface 602, the object-side and image-side surfaces 601 and 602 thereof being aspheric; a plastic second lens element 610 with positive refractive power having a concave object-side surface 611 and a convex image-side surface 612, the object-side and image-side surfaces 611 and 612 thereof being aspheric; and a plastic third lens element 620 with negative refractive power having a concave object-side surface 621 and a concave image-side surface 622 on which at least one inflection point is formed, the object-side and image-side surfaces 621 and 622 thereof being aspheric; wherein a stop 630 is disposed between the first lens element 600 and the second lens element 610; wherein an IR filter 640 is disposed between the image-side surface 622 of the third lens element 620 and an image plane 650; and wherein the IR filter 640 is made of glass and has no influence on the focal length of the photographing optical lens assembly.

The equation of the aspheric surface profiles of the sixth embodiment has the same form as that of the first embodiment.

In the sixth embodiment of the present photographing optical lens assembly, the focal length of the photographing optical lens assembly is f, and it satisfies the relation: f=5.22 (mm).

In the sixth embodiment of the present photographing optical lens assembly, the f-number of the photographing optical lens assembly is Fno, and it satisfies the relation: Fno=2.90.

In the sixth embodiment of the present photographing optical lens assembly, half of the maximal field of view of the photographing optical lens assembly is HFOV, and it satisfies the relation: HFOV=32.2 deg.

In the sixth embodiment of the present photographing optical lens assembly, the Abbe number of the first lens element 600 is V1, the Abbe number of the second lens element 610 is V2, the Abbe number of the third lens element 620 is V3, and they satisfy the relations: |V1−V2|=33.4, |V1−V3|=33.4.

In the sixth embodiment of the present photographing optical lens assembly, the thickness of the first lens element 600 near the optical axis is CT1, the thickness of the second lens element 610 near the optical axis is CT2, and they satisfy the relations: CT1=1.200 mm, CT2=1.200 mm.

In the sixth embodiment of the present photographing optical lens assembly, the radius of curvature of the object-side surface 601 of the first lens element 600 is R1, the radius of curvature of the image-side surface 602 of the first lens element 600 is R2, and they satisfy the relation: (R1/R2)*10=−1.22.

In the sixth embodiment of the present photographing optical lens assembly, the focal length of the photographing optical lens assembly is f, the focal length of the first lens element 600 is f1, and they satisfy the relation: f/f1=1.45.

In the sixth embodiment of the present photographing optical lens assembly, the thickness of the second lens element 610 near the optical axis is CT2, the focal length of the photographing optical lens assembly is f, and they satisfy the relation: CT2/f=0.23.

In the sixth embodiment of the present photographing optical lens assembly, the image plane 650 is provided with an electronic sensor for image formation of an imaged object. The spacing near the optical axis between the stop 630 and the electronic sensor is SL, the spacing near the optical axis between the object-side surface 601 of the first lens element 600 and the electronic sensor is TTL, and they satisfy the relation: SL/TTL=0.78.

In the sixth embodiment of the present photographing optical lens assembly, the radius of curvature of the object-side surface 601 of the first lens element 600 is R1, the focal length of the photographing optical lens assembly is f, and they satisfy the relation: R1/f=0.39.

In the sixth embodiment of the present photographing optical lens assembly, the refractive index of the first lens element 610 is N1, the refractive index of the second lens element 610 is N2, the refractive index of the third lens element 620 is N3, and they satisfy the relations: N1=1.514, N2=1.633, N3=1.633.

In the sixth embodiment of the present photographing optical lens assembly, the focal length of the photographing optical lens assembly is f, the focal length of the second lens element 610 is f2, and they satisfy the relation: f/f2=1.62.

In the sixth embodiment of the present photographing optical lens assembly, the focal length of the second lens element 610 is f2, the focal length of the third lens element 620 is f3, and they satisfy the relation: f2/f3=−1.52.

In the sixth embodiment of the present photographing optical lens assembly, the focal length of the photographing optical lens assembly is f, the entrance pupil diameter of the photographing optical lens assembly is EPD, and they satisfy the relation: f/EPD=2.90.

In the sixth embodiment of the present photographing optical lens assembly, the radius of curvature of the object-side surface 611 of the second lens element 610 is R3, the radius of curvature of the image-side surface 612 of the second lens element 610 is R4, and they satisfy the relation: (R3+R4)/(R3−R4)=4.01.

In the sixth embodiment of the present photographing optical lens assembly, the image plane 650 is provided with an electronic sensor for image formation of an imaged object. The spacing near the optical axis between the object-side surface 601 of the first lens element 600 and the electronic sensor is TTL, half of the diagonal length of the effective pixel area of the electronic sensor is ImgH, and they satisfy the relation: TTL/ImgH=1.80.

The detailed optical data of the sixth embodiment is shown in FIG. 17 (TABLE 11), and the aspheric surface data is shown in FIG. 18 (TABLE 12), wherein the units of the radius of curvature, the thickness and the focal length are expressed in mm, and HFOV is half of the maximal field of view.

It is to be noted that TABLES 1-12 (illustrated in FIGS. 7-18 respectively) show different data of the different embodiments, however, the data of the different embodiments are obtained from experiments. Therefore, any photographing optical lens assembly of the same structure is considered to be within the scope of the present invention even if it uses different data. The embodiments depicted above and the appended drawings are exemplary and are not intended to limit the claim scope of the present invention. TABLE 13 (illustrated in FIG. 19) shows the data of the respective embodiments resulting from the equations.

What is claimed is:

1. A photographing optical lens assembly comprising, in order from an object side to an image side:
   a first lens element with positive refractive power having a convex object-side surface and a convex image-side surface;
   a second lens element with positive refractive power having a concave object-side surface and a convex image-side surface, the object-side and image-side surfaces thereof being aspheric;
   a third lens element with negative refractive power having a concave image-side surface on which at least one inflection point is formed, the object-side and image-side surfaces thereof being aspheric; and
   a stop disposed between an imaged object and the second lens element; wherein there are only three lens elements with refractive power; and wherein an Abbe number of the first lens element is V1, an Abbe number of the second lens element is V2, an Abbe number of the third lens element is V3, a thickness of the first lens element near the optical axis is CT1, a thickness of the second lens element near the optical axis is CT2, a radius of curvature of the object-side surface of the first lens element is R1, a radius of curvature of the image-side surface of the first lens element is R2, and they satisfy the relations: |V1−V2|<35, |V1−V3|<15, 0.10 mm<CT1<1.30 mm, 0.10 mm<CT2<1.00 mm, −10.0<(R1/R2)*10 <−0.61.

2. The photographing optical lens assembly according to claim 1, wherein the second and third lens elements are made of plastic material.

3. The photographing optical lens assembly according to claim 2, wherein at least one of the object-side and image-side surfaces of the first lens element is aspheric, and wherein the third lens element has a convex object-side surface.

4. The photographing optical lens assembly according to claim 2, wherein a focal length of the photographing optical lens assembly is f, a focal length of the first lens element is f1, and they satisfy the relation: 1.00<f/f1<2.00.

5. The photographing optical lens assembly according to claim 4, wherein the focal length of the photographing optical lens assembly is f, the focal length of the first lens element is f1, and they satisfy the relation: 1.20<f/f1<1.70.

6. The photographing optical lens assembly according to claim 2, wherein the thickness of the second lens element near the optical axis is CT2, the focal length of the photographing optical lens assembly is f, and they satisfy the relation: 0.05<CT2/f<0.22.

7. The photographing optical lens assembly according to claim 6, wherein the thickness of the second lens element near the optical axis is CT2, the focal length of the photographing optical lens assembly is f, and they satisfy the relation: 0.05<CT2/f<0.19.

8. The photographing optical lens assembly according to claim 3, wherein the radius of curvature of the object-side surface of the first lens element is R1, the radius of curvature of the image-side surface of the first lens element is R2, and they satisfy the relation: −10.0<(R1/R2)*10<−2.0.

9. The photographing optical lens assembly according to claim 2, wherein the photographing optical lens assembly is provided with a stop and an electronic sensor for image formation of an imaged object, wherein the stop is disposed between the imaged object and the first lens element, and wherein a spacing near the optical axis between the stop and the electronic sensor is SL, a spacing near the optical axis between the object-side surface of the first lens element and the electronic sensor is TTL, and they satisfy the relation: 0.93<SL/TTL<1.07.

10. The photographing optical lens assembly according to claim 9, wherein the radius of curvature of the object-side surface of the first lens element is R1, the focal length of the photographing optical lens assembly is f, and they satisfy the relation: 0.25<R1/f<0.63.

11. The photographing optical lens assembly according to claim 10, wherein the radius of curvature of the object-side surface of the first lens element is R1, the focal length of the photographing optical lens assembly is f, and they satisfy the relation: 0.30<R1/f<0.50.

12. The photographing optical lens assembly according to claim 3, wherein a refractive index of the first lens element is N1, a refractive index of the second lens element is N2, a refractive index of the third lens element is N3, and they satisfy the relations: 1.52<N1<1.58, 1.52<N2<1.58, 1.52<N3<1.58.

13. The photographing optical lens assembly according to claim 12, wherein the focal length of the photographing optical lens assembly is f, a focal length of the second lens element is f2, and they satisfy the relation: 0.70<f/f2<2.00.

14. The photographing optical lens assembly according to claim 13, wherein the focal length of the second lens element is f2, a focal length of the third lens element is f3, and they satisfy the relation: −1.5<f2/f3 <−0.5.

15. The photographing optical lens assembly according to claim 3, wherein the Abbe number of the first lens element is V1, the Abbe number of the second lens element is V2, and they satisfy the relation: |V1−V2|<15.

16. The photographing optical lens assembly according to claim 3, wherein the focal length of the photographing optical lens assembly is f, an entrance pupil diameter of the photographing optical lens assembly is EPD, and they satisfy the relation: 1.60<f/EPD<3.20.

17. The photographing optical lens assembly according to claim 3, wherein a radius of curvature of the object-side surface of the second lens element is R3, a radius of curvature of the image-side surface of the second lens element is R4, and they satisfy the relation: 3.0<(R3+R4)/(R3−R4)<7.0.

18. The photographing optical lens assembly according to claim 2 further comprising an electronic sensor for image formation of an imaged object, wherein the spacing near the optical axis between the object-side surface of the first lens element and the electronic sensor is TTL, half of the diagonal length of the effective pixel area of the electronic sensor is ImgH, and they satisfy the relation: TTL/ImgH<2.10.

19. A photographing optical lens assembly comprising, in order from an object side to an image side:
   a first lens element with positive refractive power having a convex object-side surface and a convex image-side surface;
   a second lens element with positive refractive power having a concave object-side surface and a convex image-side surface, the object-side and image-side surfaces thereof being aspheric;
   a third lens element with negative refractive power having a concave image-side surface on which at least one inflection point is formed, the object-side and image-side surfaces thereof being aspheric; and
   a stop disposed between an imaged object and the second lens element; wherein there are only three lens elements with refractive power; and wherein a thickness of the second lens element near the optical axis is CT2, a focal length of the photographing optical lens assembly is f, a radius of curvature of the object-side surface of the first lens element is R1, a radius of curvature of the image-side surface of the first lens element is R2, an Abbe number of the first lens element is V1, an Abbe number of the second lens element is V2, an Abbe number of the third lens element is V3, and they satisfy the relations: 0.05<CT2/f<0.19, −10.0<(R1/R2)*10 <−0.61, |V1−V2|<35, |V1−V3|<35, 0.25<R1/f<0.63.

20. The photographing optical lens assembly according to claim 19, wherein at least one of the object-side and image-side surfaces of the first lens element is aspheric, and wherein the third lens element has a convex object-side surface.

21. The photographing optical lens assembly according to claim 19, wherein a refractive index of the first lens element is N1, a refractive index of the second lens element is N2, a refractive index of the third lens element is N3, and they satisfy the relations: 1.52<N1<1.58, 1.52<N2<1.58, 1.52<N3<1.58.

22. The photographing optical lens assembly according to claim 21, wherein the Abbe number of the first lens element is V1, the Abbe number of the second lens element is V2, the Abbe number of the third lens element is V3, and they satisfy the relations: |V1−V2|<15, |V1−V3|<15.

23. The photographing optical lens assembly according to claim 20, wherein the photographing optical lens assembly is provided with a stop and an electronic sensor for image formation of an imaged object, wherein the stop is disposed between the imaged object and the first lens element, and wherein a spacing near the optical axis between the stop and the electronic sensor is SL, a spacing near the optical axis between the object-side surface of the first lens element and the electronic sensor is TTL, and they satisfy the relation: 0.93<SL/TTL<1.07.

24. The photographing optical lens assembly according to claim 23, wherein the radius of curvature of the object-side surface of the first lens element is R1, the radius of curvature of the image-side surface of the first lens element is R2, and they satisfy the relation: −10.0<(R1/R2)*10<−2.0.

25. The photographing optical lens assembly according to claim 19, wherein the radius of curvature of the object-side surface of the first lens element is R1, the focal length of the photographing optical lens assembly is f, and they satisfy the relation: 0.30<R1/f<0.50.

* * * * *